(12) United States Patent
Miyahara et al.

(10) Patent No.: US 8,261,627 B2
(45) Date of Patent: Sep. 11, 2012

(54) ROLLING BODY SCREW DEVICE

(75) Inventors: Soshi Miyahara, Tokyo (JP); Toshiaki Kadono, Tokyo (JP); Masahiko Yoshino, Tokyo (JP); Takashi Sakuyama, Tokyo (JP); Lina Teng, Tokyo (JP); Tsutomu Togashi, Tokyo (JP); Kazuhiro Tani, Tokyo (JP)

(73) Assignee: THK Co., Ltd., Tokyo (JP)

( * ) Notice: Subject to any disclaimer, the term of this patent is extended or adjusted under 35 U.S.C. 154(b) by 262 days.

(21) Appl. No.: 12/738,810

(22) PCT Filed: Oct. 7, 2008

(86) PCT No.: PCT/JP2008/068200
§ 371 (c)(1),
(2), (4) Date: Apr. 19, 2010

(87) PCT Pub. No.: WO2009/057424
PCT Pub. Date: May 7, 2009

(65) Prior Publication Data
US 2010/0236345 A1 Sep. 23, 2010

(30) Foreign Application Priority Data
Oct. 31, 2007 (JP) ................ 2007-284502

(51) Int. Cl.
*F16H 1/24* (2006.01)
*F16H 55/02* (2006.01)
(52) U.S. Cl. ............... 74/424.86; 74/424.87; 74/424.82
(58) Field of Classification Search ........... 74/424.82, 74/424.86, 424.87; 384/43
See application file for complete search history.

(56) References Cited

U.S. PATENT DOCUMENTS

| 4,148,226 | A | | 4/1979 | Benton | |
|---|---|---|---|---|---|
| 5,193,409 | A | * | 3/1993 | Babinski | 74/424.83 |
| 5,555,770 | A | * | 9/1996 | Dolata et al. | 74/424.86 |
| 7,185,553 | B2 | * | 3/2007 | Hayashi | 74/424.86 |
| 2001/0025540 | A1 | * | 10/2001 | Greubel | 74/424.87 |
| 2005/0126324 | A1 | | 6/2005 | Yang et al. | |

FOREIGN PATENT DOCUMENTS

| JP | 49-64672 | 9/1947 |
|---|---|---|
| JP | 11-051145 | 2/1999 |
| JP | 2004-340220 | 12/2004 |
| JP | 2005-133892 | 5/2005 |
| JP | 2007-263192 | 10/2007 |
| WO | WO 2006/046636 | 5/2006 |

OTHER PUBLICATIONS

International Search Report, PCT/JP2008/068200, Jan. 6, 2009.

* cited by examiner

*Primary Examiner* — Justin Krause
(74) *Attorney, Agent, or Firm* — Young & Thompson

(57) ABSTRACT

There is provided a new rolling body screw device manufactured with cheap cost without degrading quality in comparison with a conventional device even for a device having any large dimension in an end-cap type rolling body screw device. The rolling body screw device includes the direction changing passages 42 each including: a scoop-up portion 43 scooping a ball rolling in a loaded rolling body passage as a loaded area of the endless track so as to hand over the balls to the direction changing passage 42 as a non-loaded area of the endless track; and a route path 44 forming a circulation path of the ball scooped by the scoop-up portion. Each of the return pieces is composed, in combination, of a metal part 41*a* formed of a metal material including the scoop-up portion 43, and non-metal parts 41*b*, 41*c* formed of a non-metal material including the route path 44.

20 Claims, 25 Drawing Sheets

ROLLING BODY SCREW DEVICE

TECHNICAL FIELD

The present invention relates to a rolling body screw device.

BACKGROUND ART

Conventionally, a screw device is composed of a screw shaft having a spiral rolling body rolling surface formed in an outer peripheral surface thereof, a nut member formed with a spiral loaded rolling surface formed in an inner peripheral surface thereof so as to face the rolling body rolling surface with the same lead angle as that of the rolling body rolling surface, and a number of rolling bodies interposed between the loaded rolling surface and the rolling body rolling surface and rolling in a loaded state, and an endless track for circulating the rolling bodies is formed to the screw device.

As a method of constituting such endless track for the rolling bodies, some of methods or systems have been conventionally provided, for example, including an external circulation system using a return tube, a spinning system using a deflector, an interior circulation system using a side lid, and the like. (For example, refer to Patent Documents 1 and 2, mentioned hereinafter).

However, in these systems, at a time when the rolling body is moved from a terminal end of the endless track to a non-loaded area, the rolling body collides with a side wall of a direction changing passage formed obliquely with respect to an advancing direction of the rolling body at the terminal end of the loaded area, that is, a tangential direction along the lead angle of the loaded rolling surface, then the rolling body, now in rolling, is scooped in the direction changing passage such as return tube forming the non-loaded area, and finally, is circulated again to the start end of the loaded area.

Accordingly, in such conventional screw devices for the rolling bodies, in spite of the systems constituting the endless tracks of the rolling bodies, there was needed means for changing the rolling direction of the rolling body at the time of scooping the rolling body in the non-loaded area rolling in the loaded or feeding the rolling body in the non-loaded area to the loaded area, and therefore, the smooth circulation motion of the rolling body is essentially impaired, and as a result, uniform and stable rotational motion of the rolling body screw device was impaired, usable lifetime was shortened, and undesired noise was caused.

Then, in order to solve the above-mentioned defects encountered in the conventional technology, the applicant of the subject application has been conceived and provided an end-cap type rolling body screw device in which a member corresponding to a conventional side lid was composed of a plurality of members including a side lid body and a return piece, and ideas were applied to shape and locating position of the return piece so as to form the non-loaded area in the endless track aiming the stable circulation of the rolling body (refer to Patent Document 3, mentioned hereinafter). The rolling body screw device of the end-cap type provided by the applicant of the subject application can realize smooth circulation motion of the rolling body, which hence contributed to the uniform and stable rotational motion of the rolling body, the long usable lifetime, and the reduction of noise at the operation time of the device.

Patent Document 1: Japanese Utility Model Application Laid-open Publication No. SHO 49-64672
Patent Document 2: U.S. Pat. No. 4,148,226
Patent Document 3: Japanese Patent Application Laid-open Publication No. HEI 11-51145

DISCLOSURE OF THE INVENTION

Problems to be Solved by the Invention

However, for the rolling body screw device disclosed in the above Patent Document 3, it is necessary to form the return piece, which has a complicated shape, of a metal material, which leads to an increasing in manufacturing cost, thus being disadvantageous. Furthermore, for the rolling body screw device of the end-cap type, it is difficult to manufacture the return piece because of limitation in mold size used in the manufacturing of a device of large sized model number, which also results in an increased cost for manufacturing thereof, thus being also defective.

The present invention was conceived in consideration of the circumstances mentioned above and an object thereof is to provide an end-cap type rolling body screw device, in which a direction changing passage constituting an endless track is formed to a return piece, capable of being manufactured with reduced cost and without lowering quality in comparison with conventional devices regardless of sizes thereof.

Means for Solving the Problems

A rolling body screw device according to the present invention comprises: a screw shaft having an outer surface in which a spiral rolling body rolling surface is formed; a nut member having an inner peripheral surface in which a spiral loaded rolling surface is formed so as to oppose to the rolling body rolling surface of the screw shaft and having a non-loaded rolling body passage; a pair of return pieces mounted to both end portions of the nut member, and including direction changing passages so as to form an endless track by connecting a loaded rolling body passage formed in association with the rolling body rolling surface and the loaded rolling surface and the non-loaded rolling body passage through the direction changing passages; and a number of rolling bodies rolling in the endless track, wherein each of the direction changing passages includes: a scoop-up portion scooping the rolling body rolling in the loaded rolling body passage as a loaded area of the endless track to the direction changing passage as a non-loaded area of the endless track; and a route path forming a circulation path of the rolling body scooped by the scoop-up portion, and each of the return pieces is composed, in combination, of a metal part formed of a metal material including the scoop-up portion, and a non-metal part formed of a non-metal material including the route path.

In the rolling body screw device according to the present invention, it may be preferred that the scoop-up portion is formed in boat-bottom shape and a portion in a vicinity of the formation of the boat-bottom (rocker-bottom) shaped portion is formed of the metal part.

Further, in the rolling body screw device according to the present invention, the direction changing passage may include a lip portion, for aligning and circulating spacer members disposed between the rolling bodies, at a portion opposing to the portion at which the scoop-up portion is formed, and a portion in a vicinity of the formation of the lip portion is formed of the metal part.

Furthermore, in the rolling body screw device according to the present invention, each of the return pieces may have one end side fitted into a recessed portion formed to the end portion of the nut member, and have another end side is pressed by a cover plate to thereby position the return piece with respect to the nut member.

Still furthermore, in the rolling body screw device according to the present invention, it may be preferred that the other end side of the return piece pressed by the cover plate has a pressed surface to which a plurality of projections are formed so as to distribute the pressing force from the cover plate to an entire area of the pressed surface.

Still furthermore, in the rolling body screw device according to the present invention, it may be desired that either one of the metal part and the non-metal part is formed with a boss and another one thereof is formed with a boss hole, and the return piece is constituted by fitting the boss into the boss hole, and a bolt hole formed by combining the metal part and the non-metal part is formed to each of the metal part and the non-metal part as through hole, and the return piece is screwed and fastened with the nut member by means of the bolt holes.

In addition, in the rolling body screw device according to the present invention, the metal part or non-metal part may be formed by further combining a plurality of divided parts.

Furthermore, in the rolling body screw device according to the present invention, the metal part may be manufactured by a metal powder injection molding method (MIM).

Still furthermore, in the rolling body screw device according to the present invention, it may be desired that a non-metal material constituting the non-metal part is an easily moldable material including a resin material.

It is further to be noted that the aspects of the above present invention do not describe all the essential features of the present invention and sub-combination thereof may also constitute the present invention.

Effect of the Invention

According to the present invention, in the end-cap type rolling body screw device in which the direction changing passage constituting the endless track is formed to the return piece, the return piece is formed, in combination, of the metal part and the non-metal part. Moreover, a portion, which requires strength, for scooping the rolling body from the terminal end of the loaded area of the endless track to the non-loaded area is formed of the metal part, and furthermore, the other portions which are less loaded by the rolling body are formed of the non-metal parts. According to such structure, even in the rolling body screw devices having any sizes, the quality is not degraded in comparison with a conventional device, and in addition, the rolling body screw device itself can be manufactured cheaply.

REFERENCE NUMERALS

10 - - - rolling body screw device, 11 - - - screw shaft, 12 - - - rolling body rolling surface, 21 - - - nut member, 23 - - - non-loaded rolling body passage, 24 - - - nut body member, 24a - - - flange portion, 25 - - - cover plate, 26 - - - labyrinth seal, 27 - - - end cap, 28 - - - recessed portion, 31 - - - ball, 32 - - - spacer member, 41 - - - return piece, 41a - - - metal part, 41a1, 41a2 - - - boss hole, 41b - - - first non-metal part, 41b1 - - - boss, 41c - - - second non-metal part, 41c1 - - - boss, 41c2 - - - projection, 42 - - - direction changing passage, 43 - - - scoop-up portion, 44 - - - route path, 45 - - - lip portion, 49 - - - bolt hole, 49a, 49b - - - hole.

BEST MODE FOR CARRYING OUT THE INVENTION

Hereunder, a preferred embodiment for embodying the present invention will be described with reference to the accompanying drawings. Further, it is to be noted that the following embodiment is not limited to the inventions defined in the respective claims and all the combinations of the subject features mentioned for the embodiment is not necessarily essential for the solution of the invention.

Figure 1:
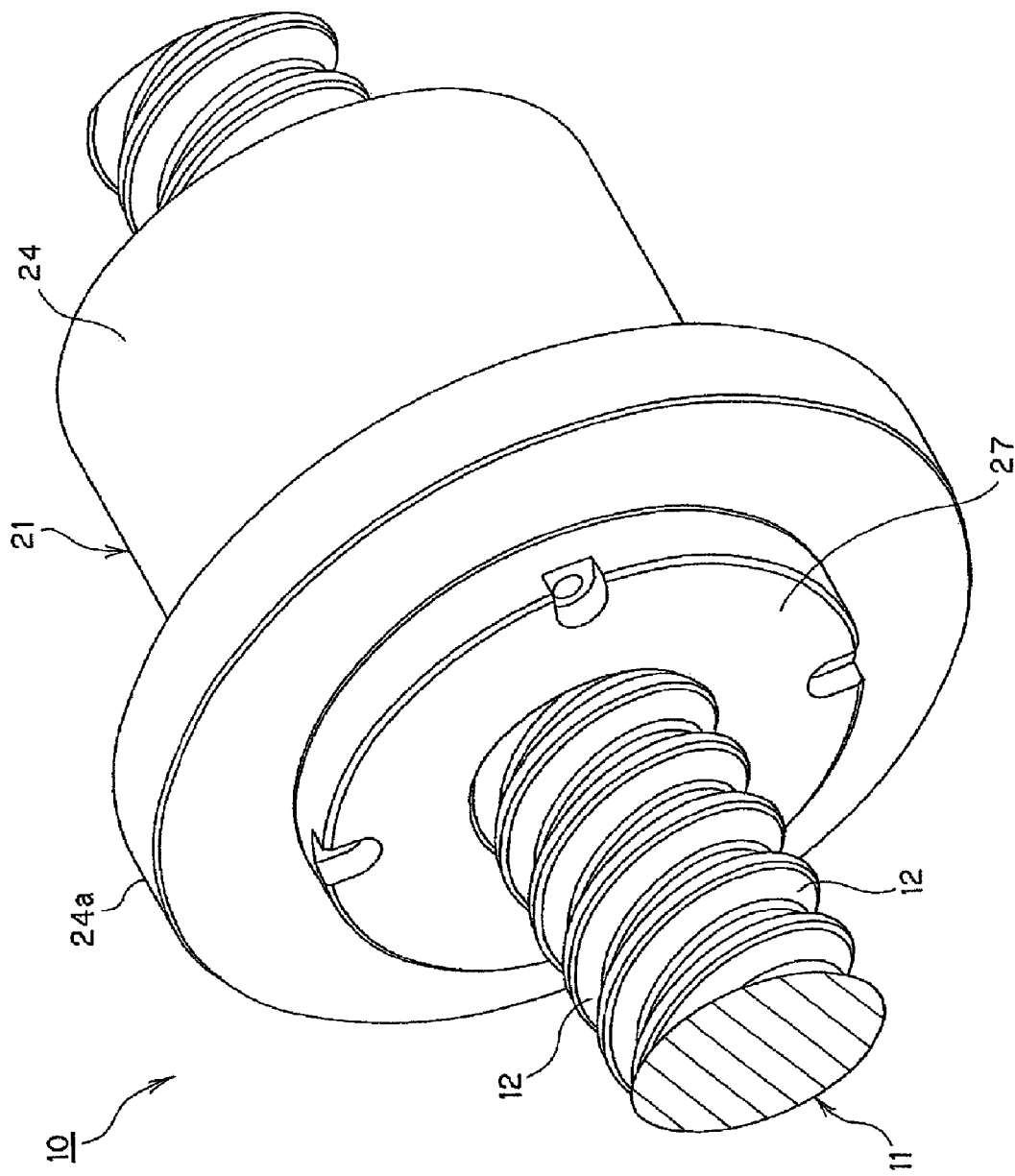
FIG. 1 is a perspective view showing an outer configuration of a rolling body screw device according to one embodiment of the present invention.
Figure 2:
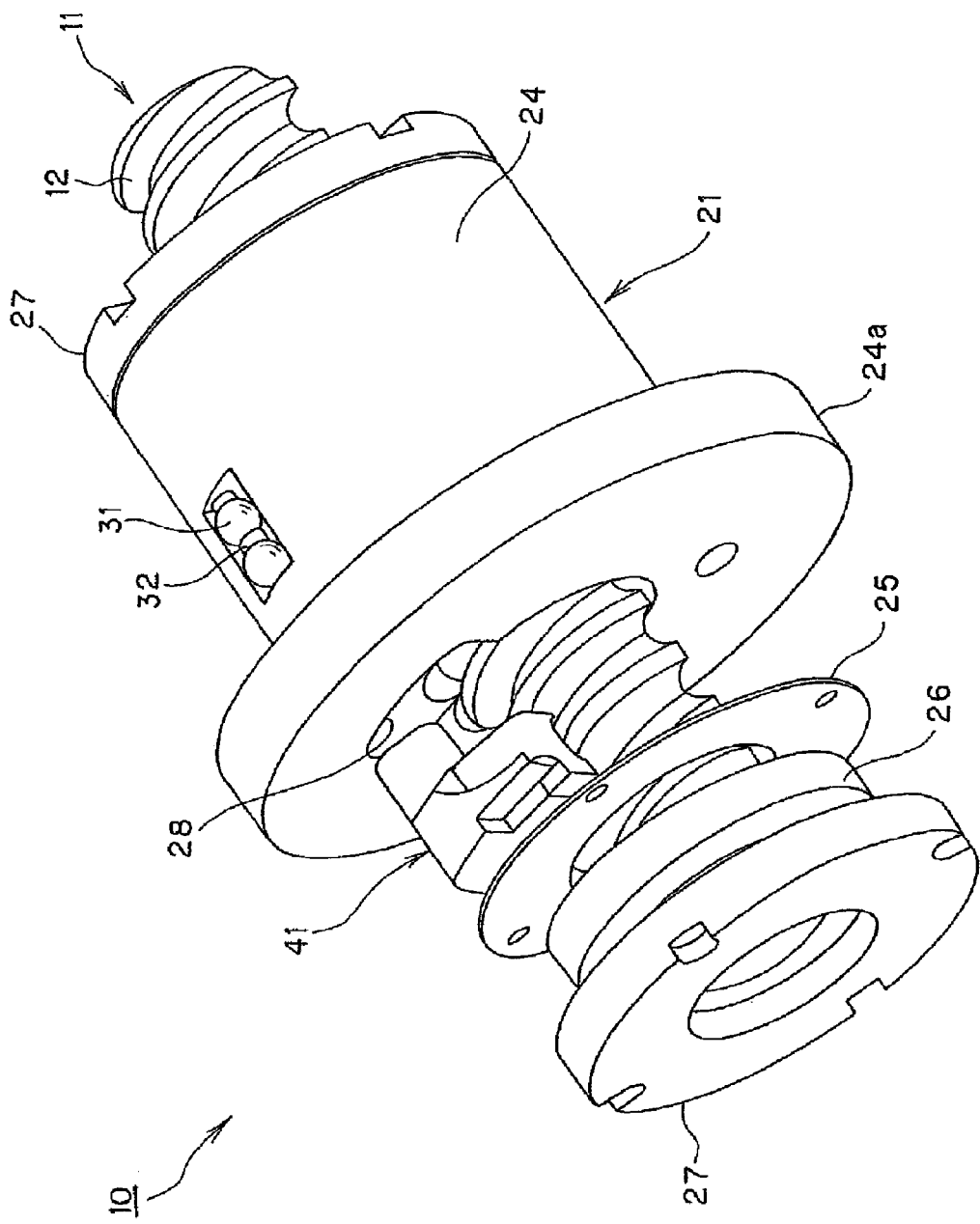
FIG. 2 is a perspective exploded view of the rolling body screw device according to the embodiment.
Figure 3:
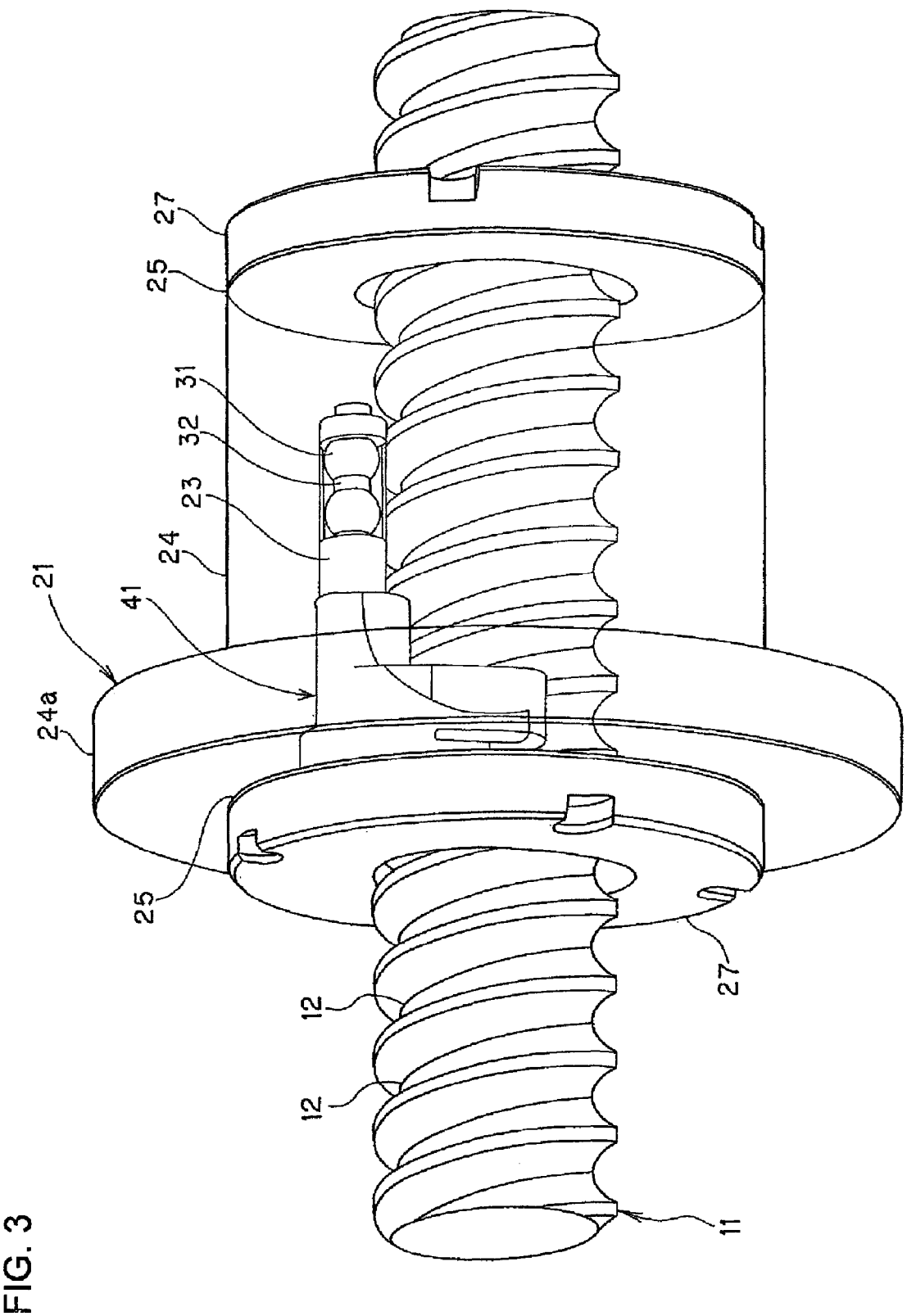
FIG. 3 is a perspective transparent view of the rolling body screw device according to the embodiment.
Figure 4:
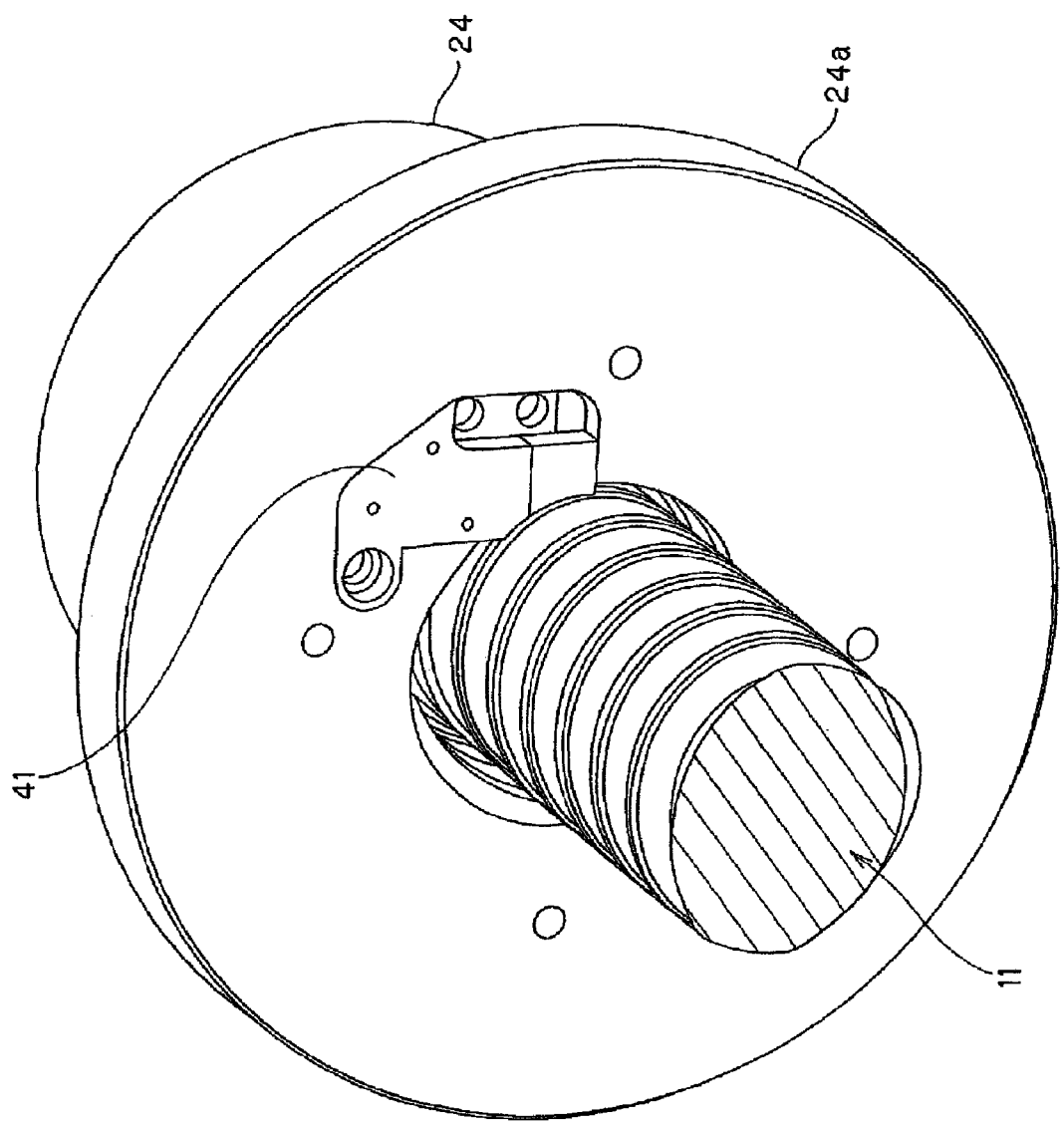
FIG. 4 is a schematic view explaining constitutional members or components of the rolling body screw device according to the embodiment.

First, an entire structure of a rolling body screw device according to the present embodiment will be explained with reference to FIGS. 1 to 7, in which FIG. 1 is a perspective view showing an outer configuration of a rolling body screw device according to one embodiment of the present invention, FIG. 2 is a perspective exploded view of the rolling body screw device according to the embodiment, FIG. 3 is a perspective transparent view of the rolling body screw device according to the embodiment, and FIGS. 4 to 7 are schematic views explaining constitutional members or components of the rolling body screw device according to the embodiment.

The rolling body screw device 10 according to the present embodiment is composed of a screw shaft 11 formed, in an outer peripheral surface thereof, with a spiral rolling body rolling surface 12, a nut member 23 formed with a spiral loaded rolling surface formed in an inner peripheral surface thereof so as to face the rolling body rolling surface 12 of the screw shaft 11 and with a non-loaded rolling body passage 23, and a plurality of balls 31 interposed to be rollable between the screw shaft 11 and the nut member 21.

The screw shaft 11 is a member extending in a longitudinal direction and, in this embodiment, two rows of rolling body rolling surfaces 12 are formed. On each of the rolling body rolling surfaces 12, a plurality of balls 31 repeatedly roll with a loaded state, so that the screw shaft 11 is itself formed of a metal material such as high bearing steel or stainless steel having high strength capable of receiving properly receiving rolling load. Generally, the screw shaft 11 is formed by effecting cutting working, grinding working or rolling working to a long round rod material to thereby form the rolling body rolling surface 12, and thereafter, end portions of the rod material are worked so as to provide the screw shaft 11.

The nut member 21 is provided with a nut body portion 24 formed with the non-loaded rolling body passage 23 as well as the loaded rolling surface formed in the inner peripheral surface thereof, return pieces 41 in which two return pieces are provided for each end side of the nut body portion 24, and a cover plate 25, labyrinth seal 26 and an end cap 26 disposed outside of the return pieces 41 in this order in each end side. Like the return pieces 41, the cover plates 25, the labyrinth seals 26 and the end caps 26 are also disposed on both end sides of the nut body portion 24. However, only one return piece 41 disposed on a flange formation side 24a of the nut body portion 24 is described in FIGS. 2 to 4 for the simple explanation and easy under standing thereof.

Two recessed portions 28 are formed to each end side of the nut body portion 24 (only one recessed portion 28 is formed on the formation side of the flange 24a in FIG. 2), and the return piece 41 is fitted to the recessed portion 28 to thereby position the return piece 41 (refer to FIG. 4). Although described hereinafter, the return piece 41 is formed with a direction changing passage 42 (rolling body rolling direction changing passage 42) connecting the loaded rolling body passage formed in cooperation with the rolling body rolling surface 12 of the screw shaft 11 and the loaded rolling surface of the nut body portion 24 and the non-loaded rolling body passage 23 so as to be communicated with each other. These loaded rolling body passage, non-loaded rolling body passage 23 and a pair of direction changing passages 42 constitute an endless track in combination.

Further, the return piece 41 is positioned by fitting into the recessed portion 28 (refer to FIG. 4), and is screwed and fixed to the nut body portion 24 by means of screws, now shown.

Figure 5:
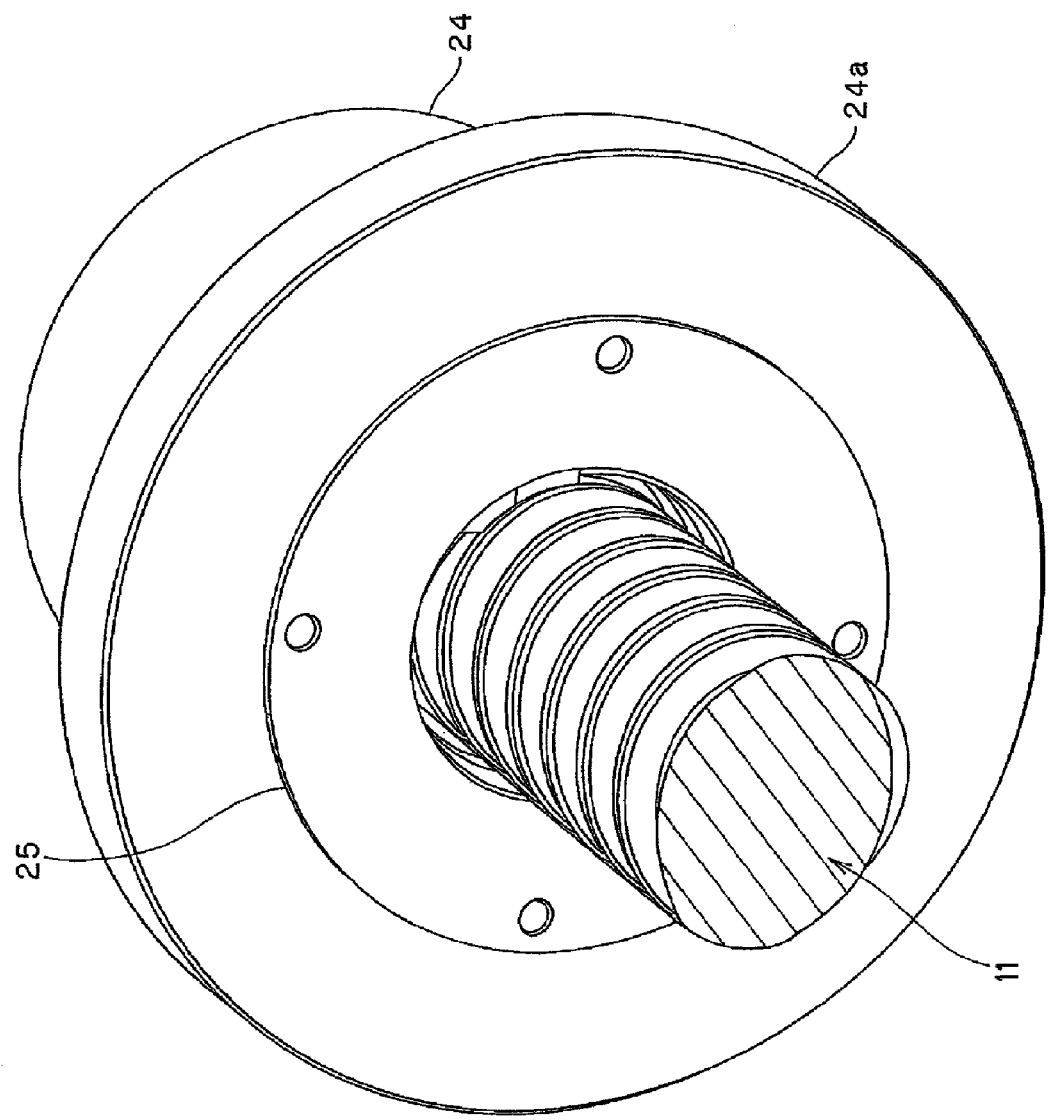
FIG. 5 is a schematic view explaining constitutional members or components of the rolling body screw device according to the embodiment.
Figure 6:
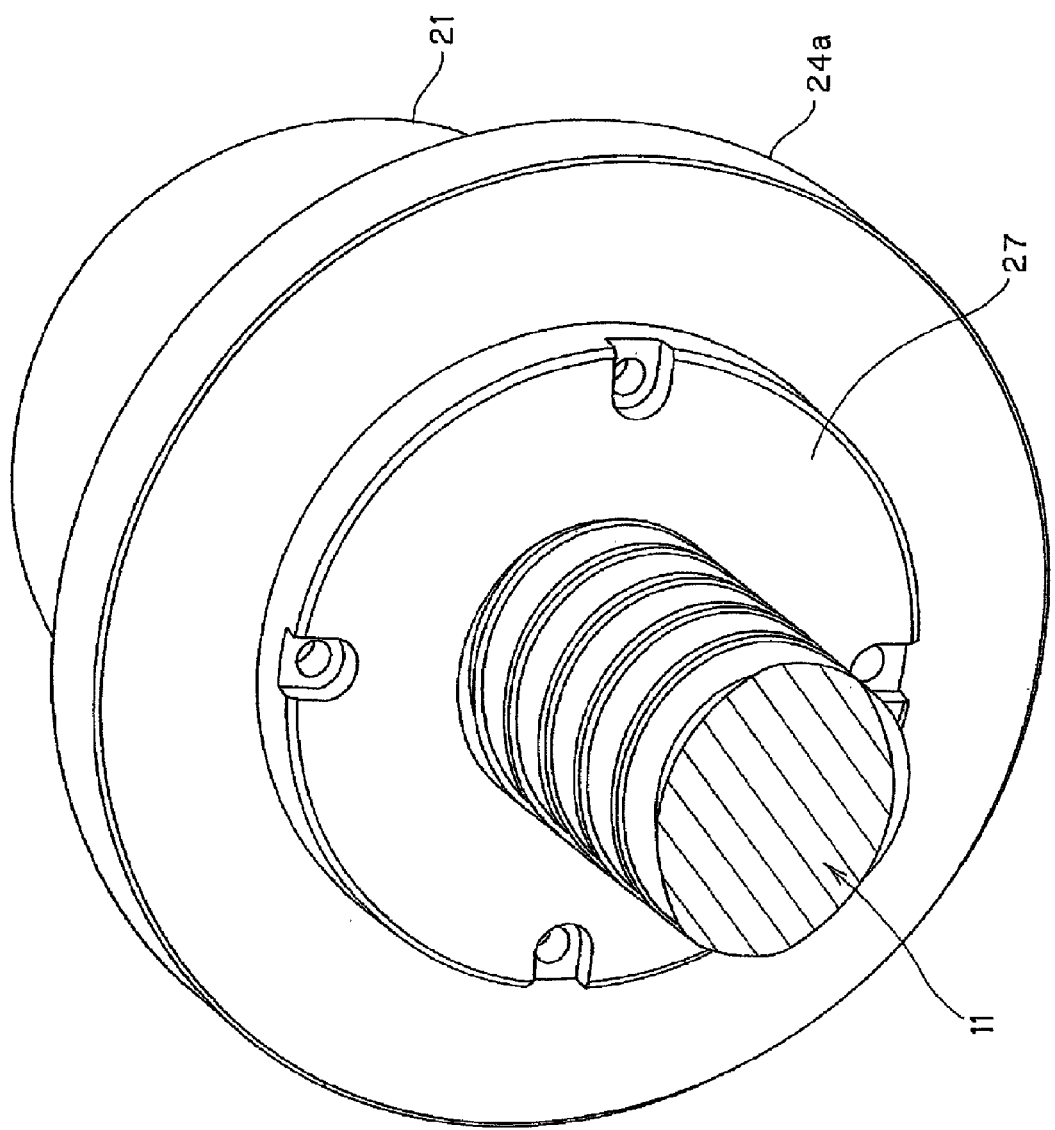
FIG. 6 is a schematic view explaining constitutional members or components of the rolling body screw device according to the embodiment.

The cover plate 25 disposed outside the return piece 41 is a plate member for pressing the return piece 41 toward the nut body portion 24, so that the cover plate 25 has a shape capable of entirely covering the outer side of the return piece 41 (see FIG. 5). Moreover, the location of the labyrinth seal 26 outside the cover plate 26 prevents lubricating agent from leaking from an interior of the nut member 21, and finally, by fixing the end cap 27 disposed most outside, the nut member 21 is completed (FIG. 6)

Figure 7:
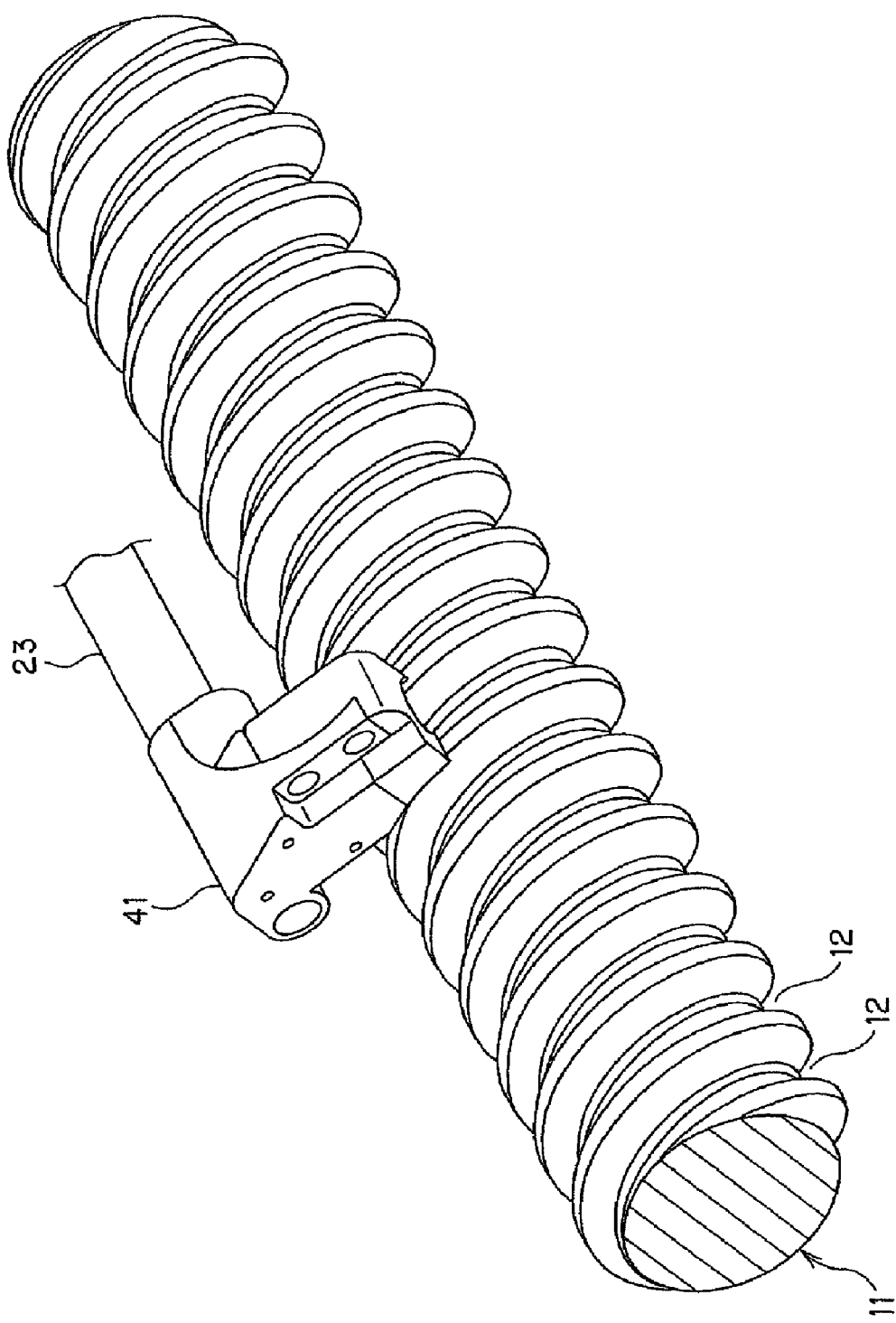
FIG. 7 is a schematic view explaining constitutional members or components of the rolling body screw device according to the embodiment.

Further, as shown in FIG. 7, the return piece 41 is maintained to a suitable position with respect to the screw shaft by the function of the recessed portion 28, so that the smooth circulation of the balls 31 can be realized, and uniform and stable rotation motion can be also realized, and moreover, usable lifetime can be elongated, as well as noise reduction function during the operation of the device.

In the forgoing description, although the entire structure of the rolling body screw device 10 according to the present embodiment was described, the rolling body screw device 10 of the present invention has a significant specific feature to the return pieces 41, and therefore, detailed explanation to the return pieces 41 according to the present embodiment will be developed hereunder.

Figure 8:
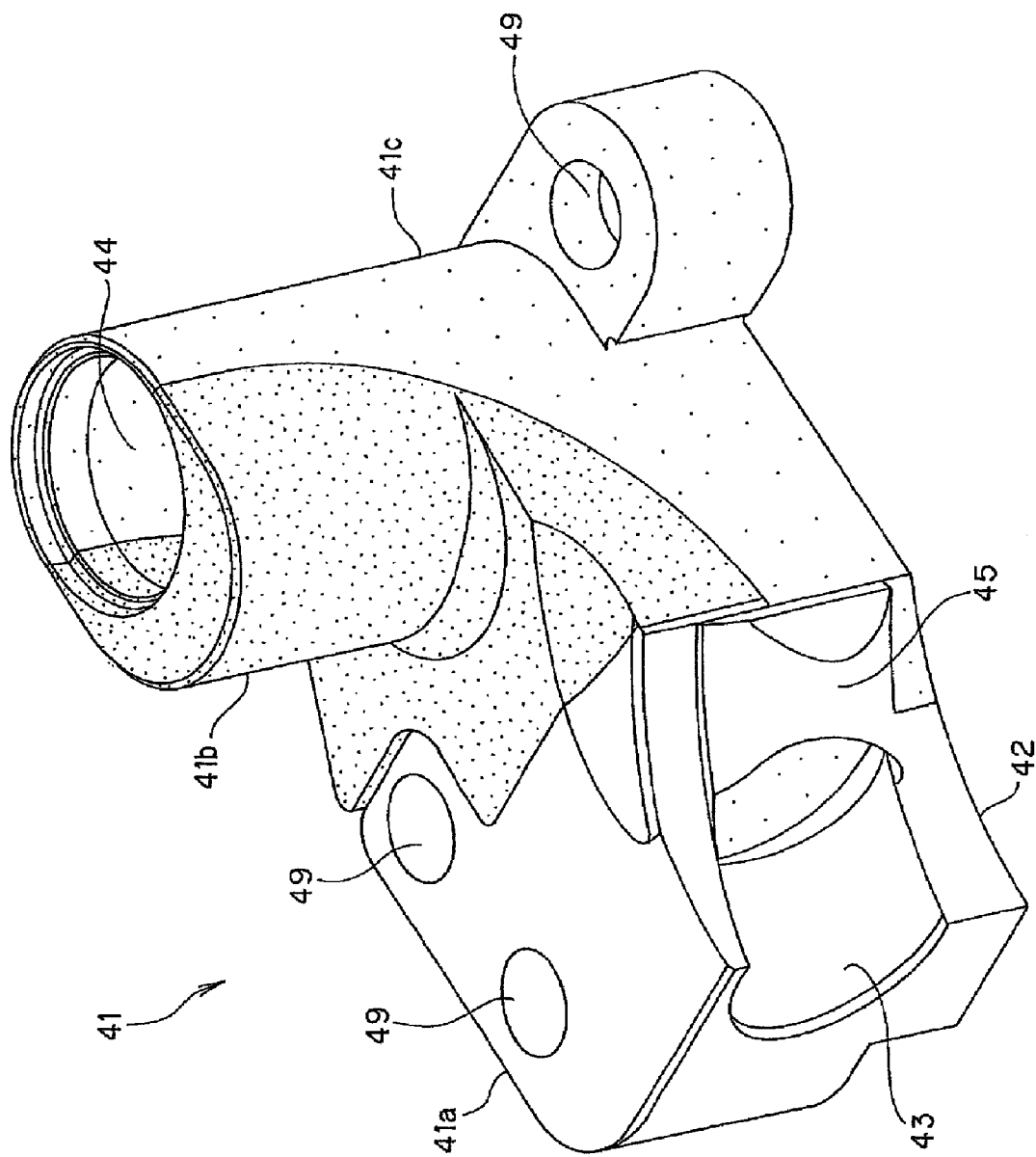
FIG. 8 shows an outer configuration of an entire structure of a return piece according to the present embodiment.
Figure 9:
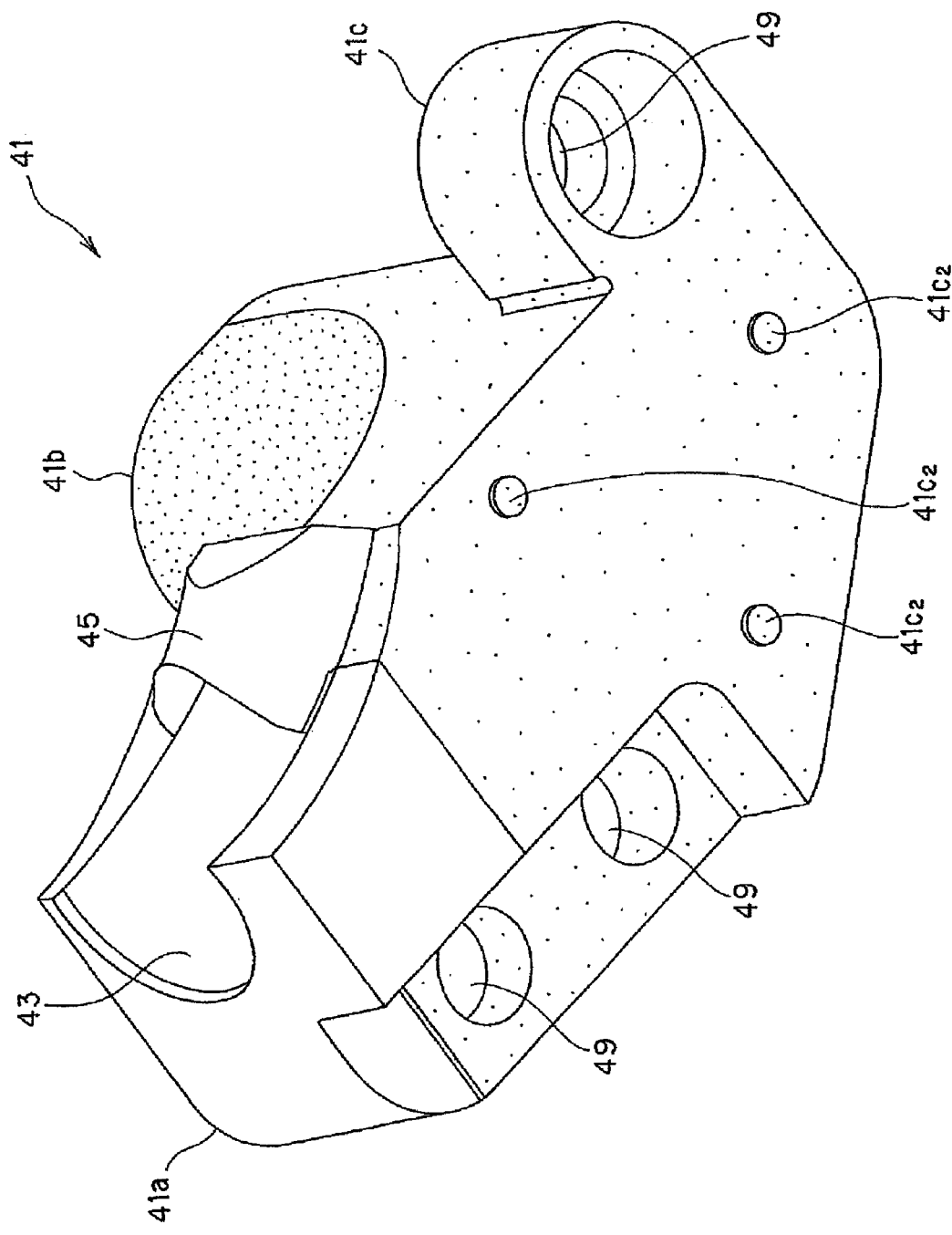
FIG. 9 shows the outer configuration of the entire structure of the return piece according to the present embodiment as viewed from a side on which the return piece is pressed by a cover plate.
Figure 10:
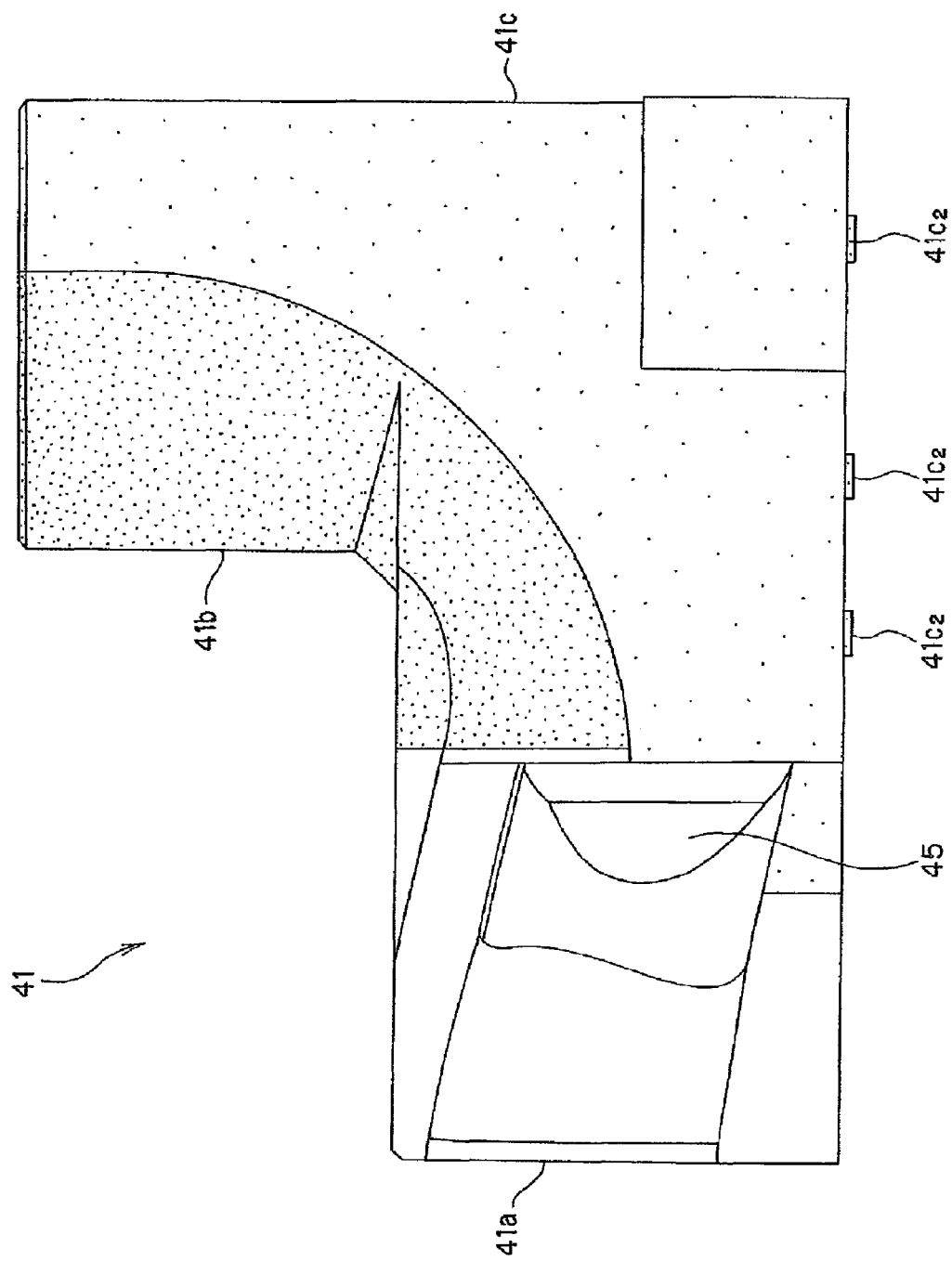
FIG. 10 shows the outer configuration of the entire structure of the return piece according to the present embodiment as a side view thereof.
Figure 11:
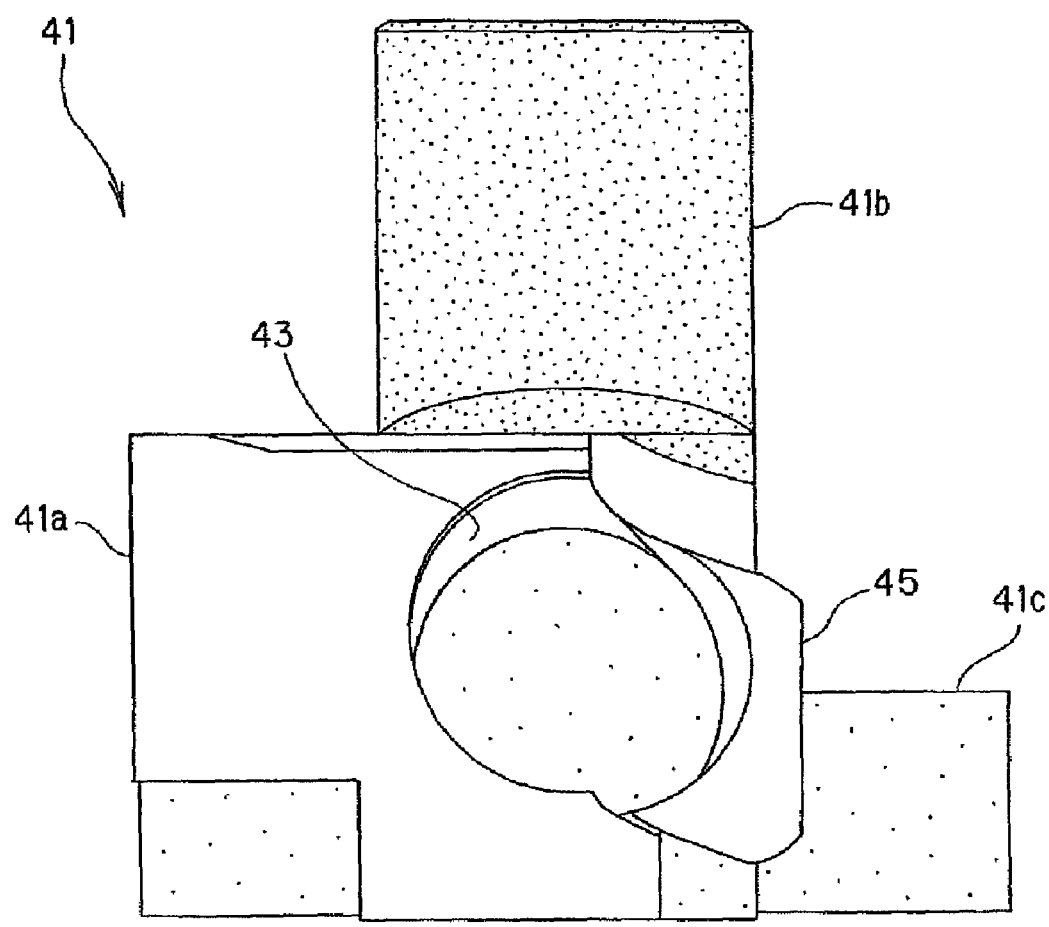
FIG. 11 shows the outer configuration of the entire structure of the return piece according to the present embodiment as a front view thereof.
Figure 12:
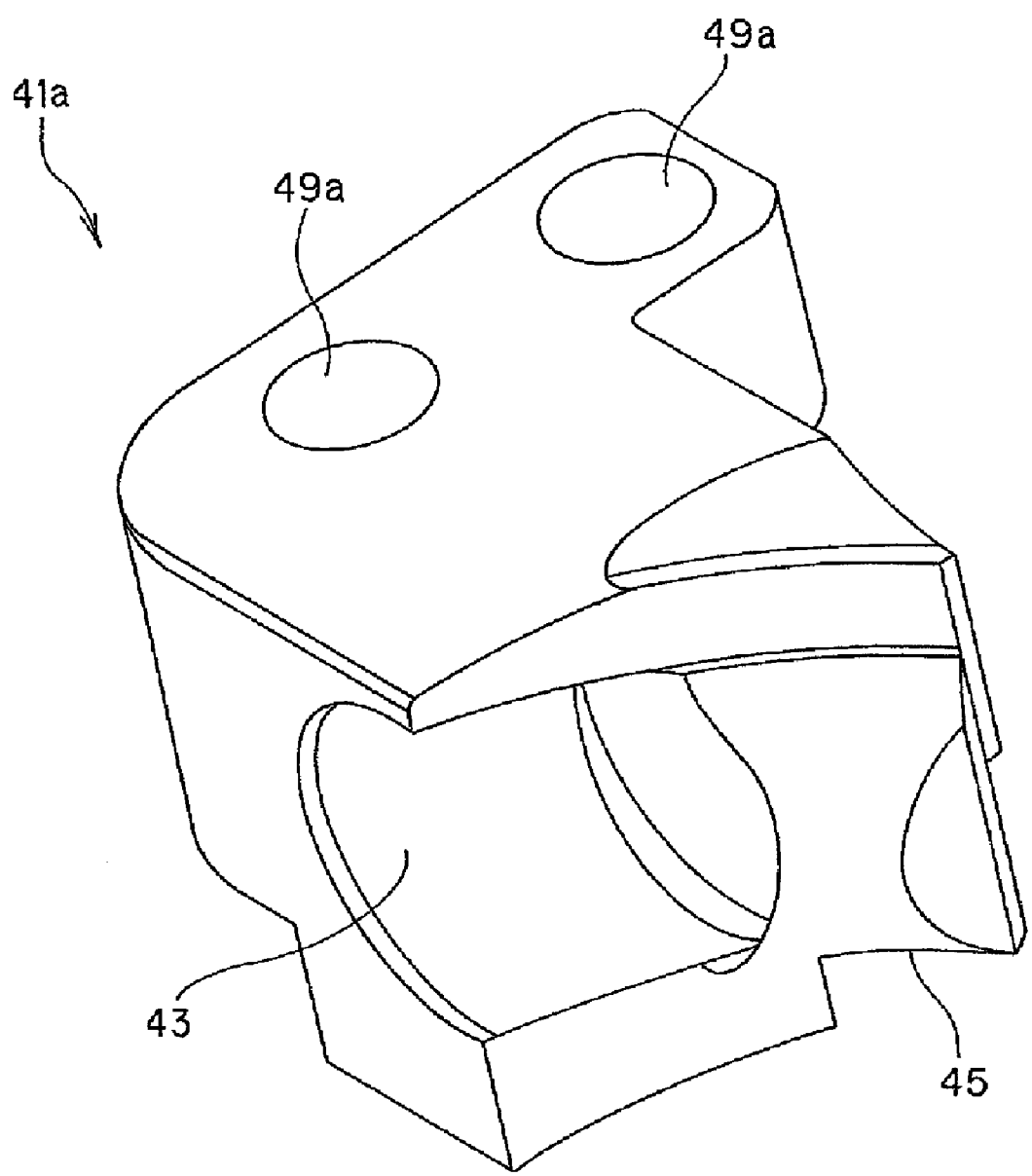
FIG. 12 is a perspective view showing an outer configuration of a metal part according to the present embodiment.
Figure 13:
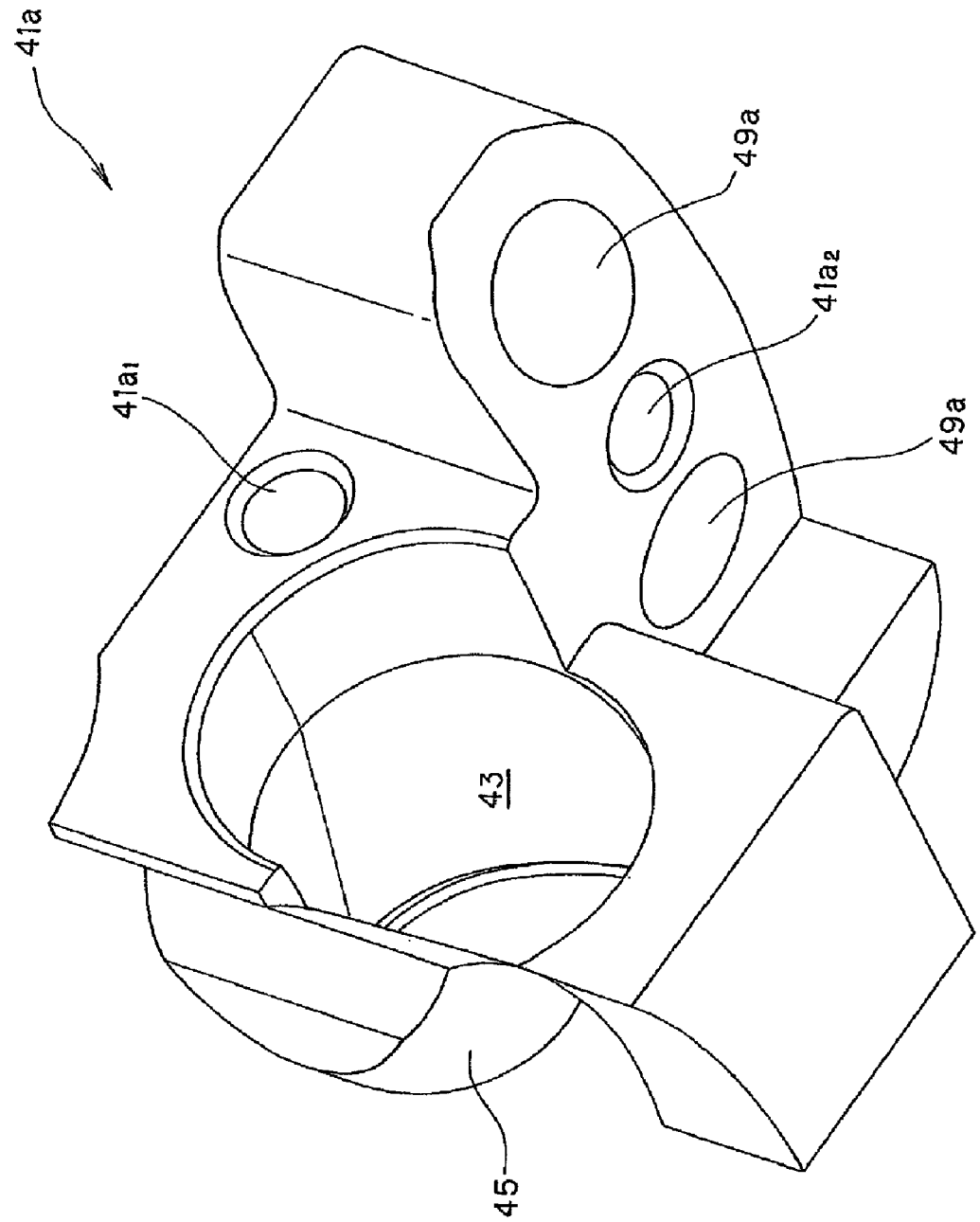
FIG. 13 is a perspective view showing the outer configuration of the metal part shown in FIG. 12 as viewed from a direction different from FIG. 12.
Figure 14:
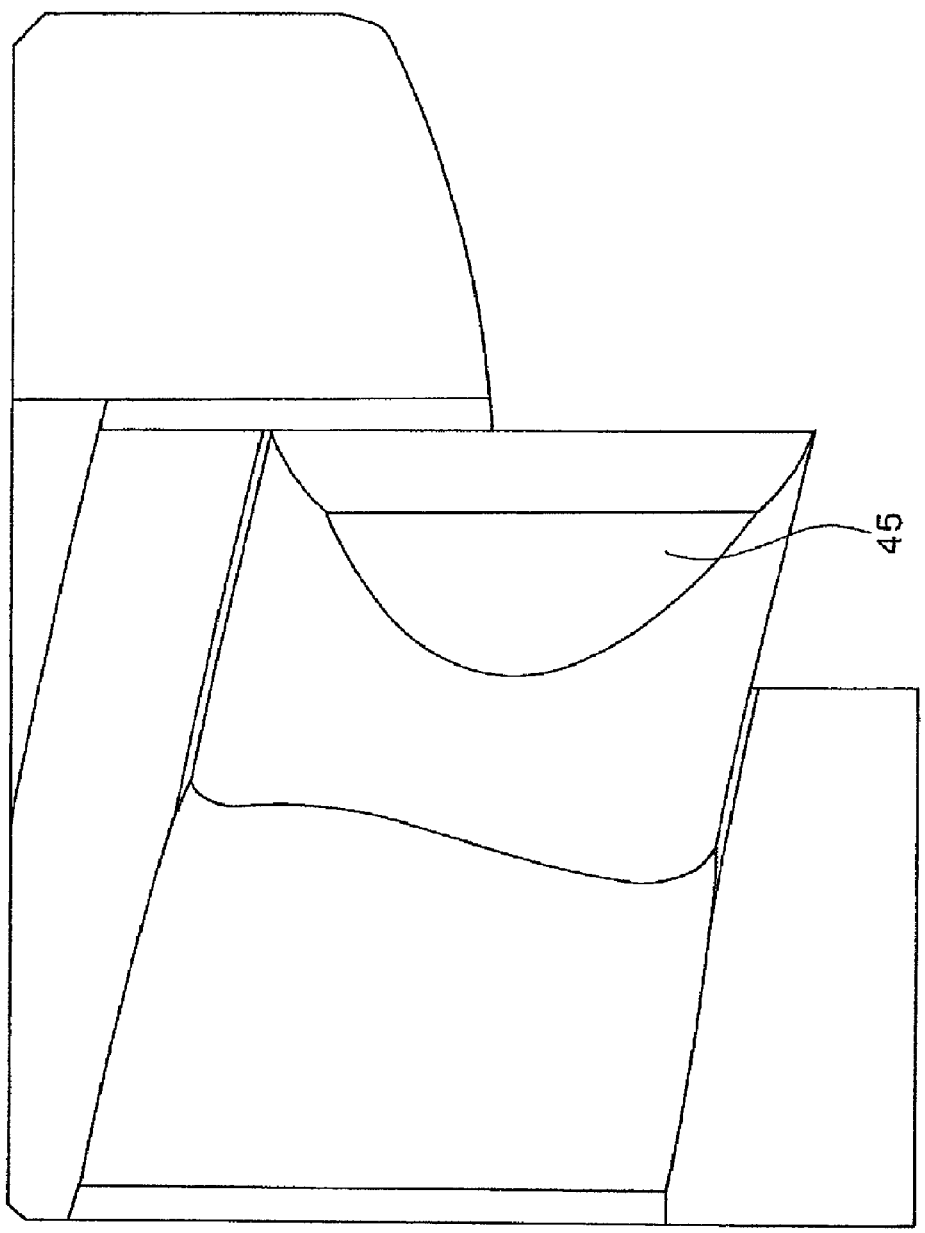
FIG. 14 is a side view of the metal part of the present embodiment.
Figure 15:
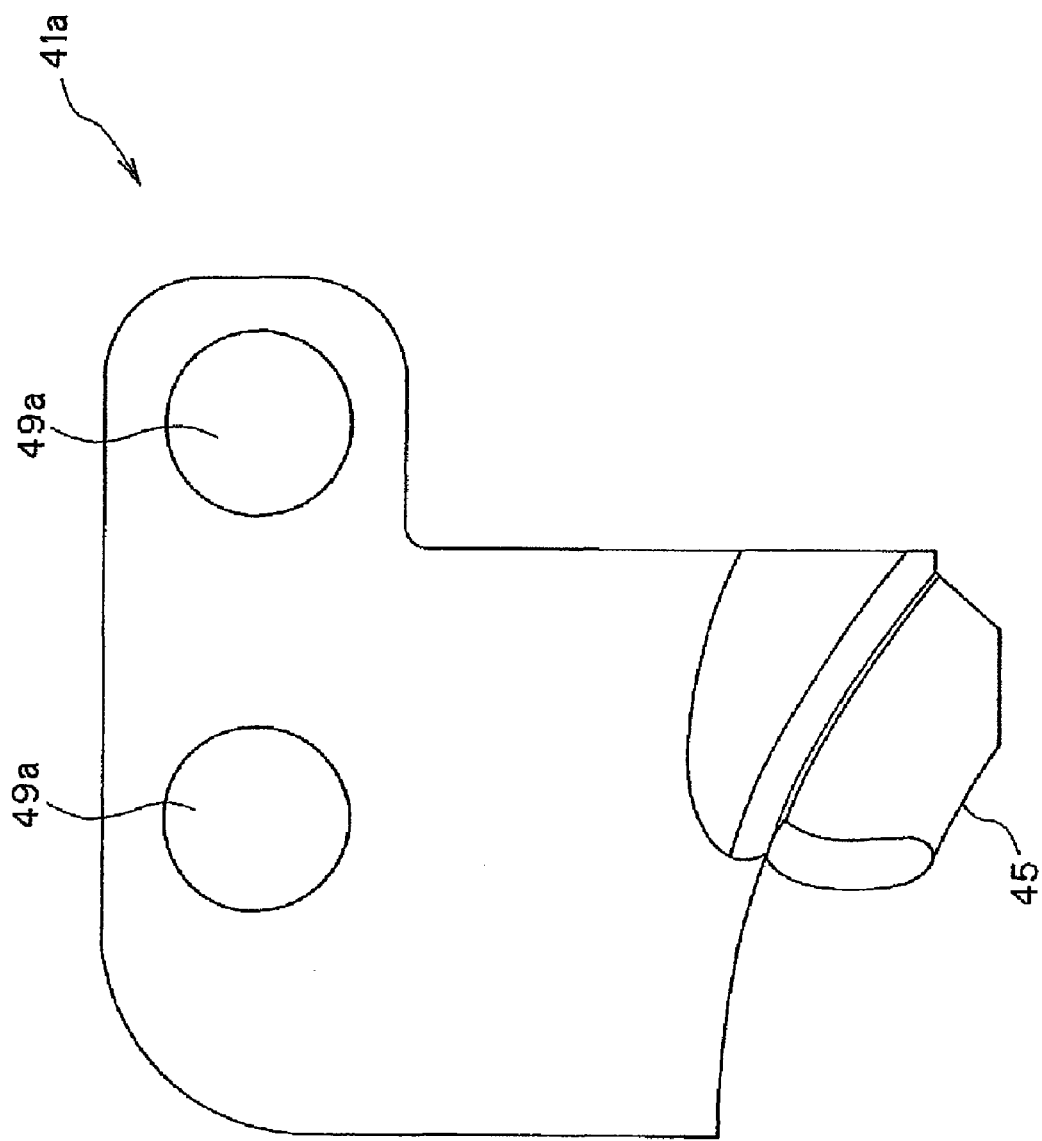
FIG. 15 is a plan view, from an upper side, of the metal part according to the present embodiment.
Figure 16:
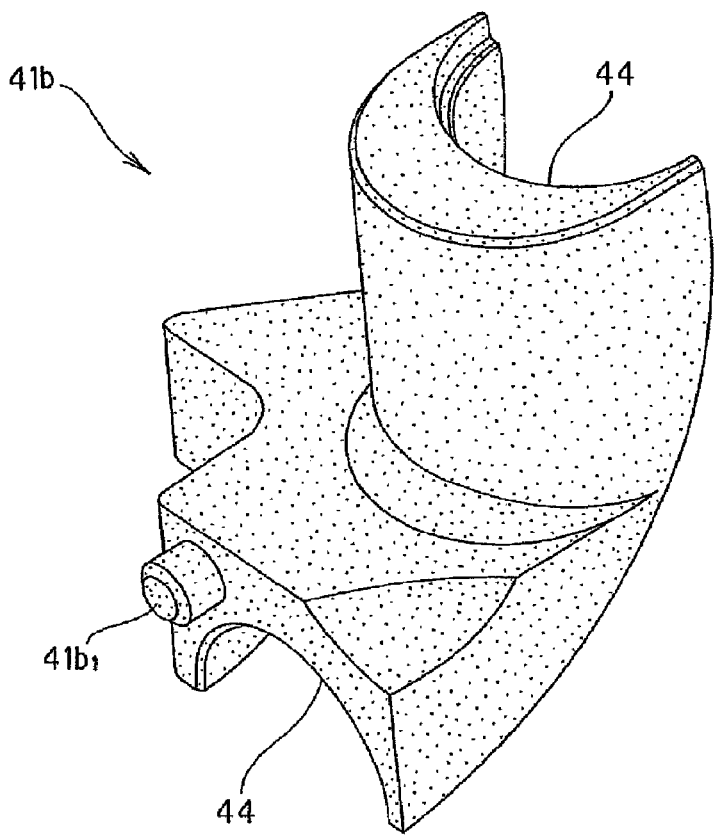
FIG. 16 is a perspective view showing an outer configuration of a first non-metal part according to the present embodiment.
Figure 17:
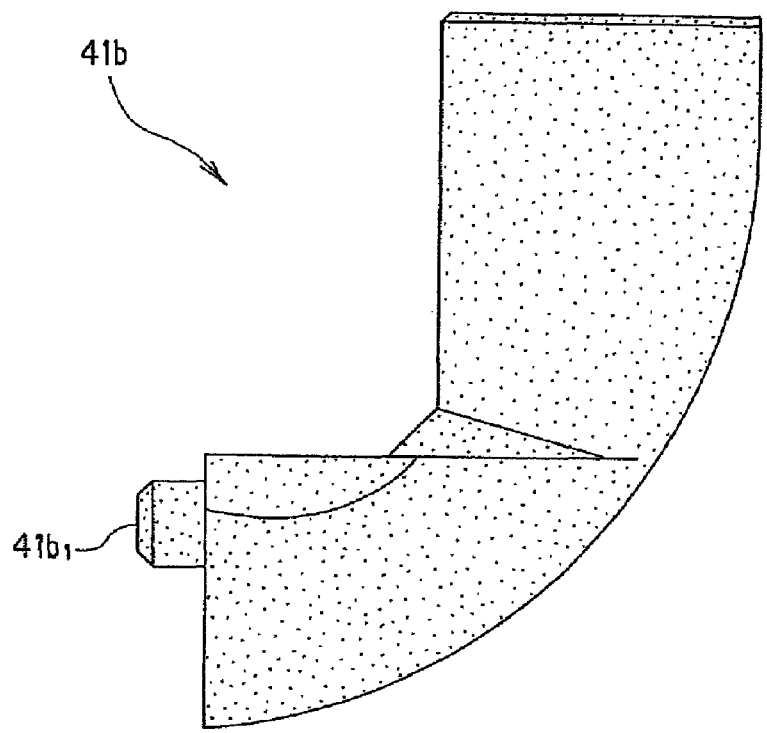
FIG. 17 is a side view of the first non-metal part of the present embodiment.
Figure 18:
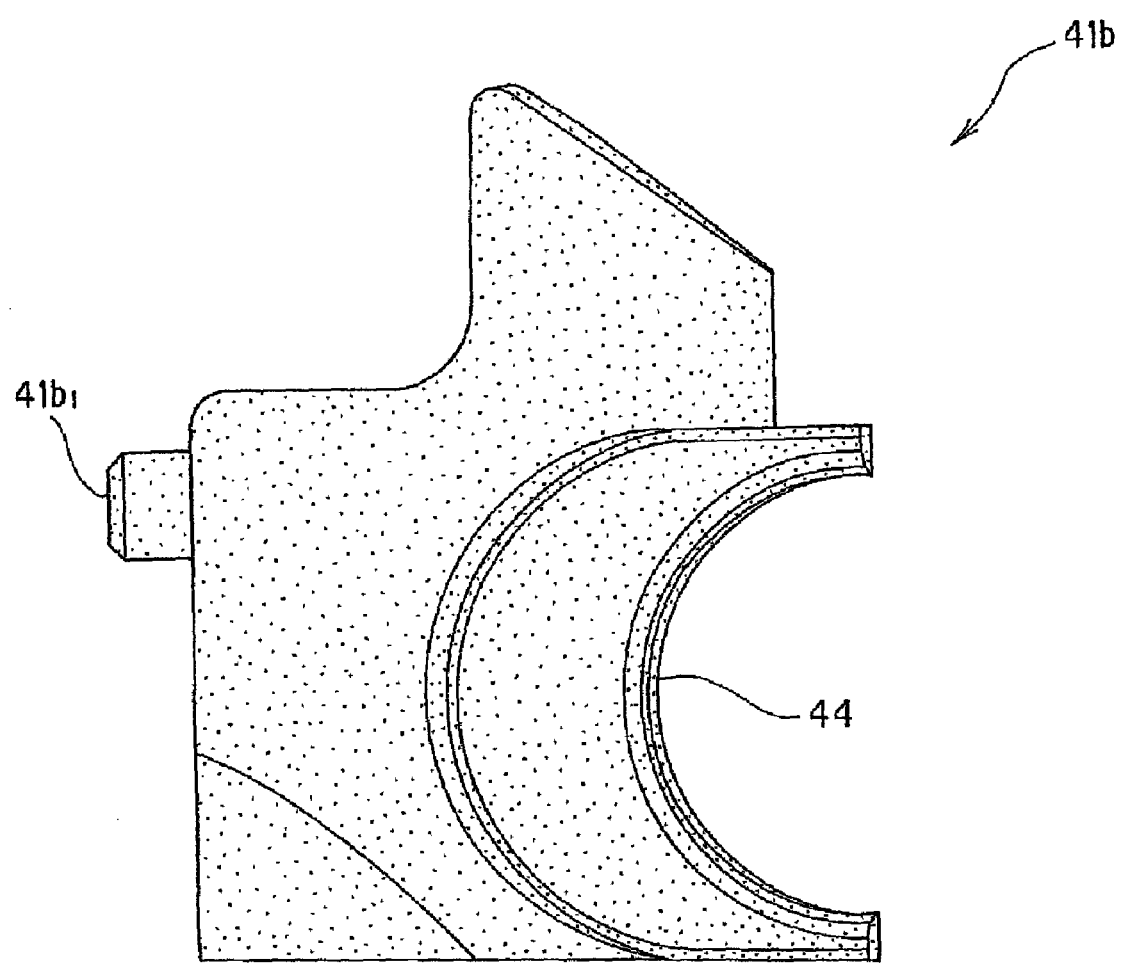
FIG. 18 is a plan view, from an upper side, of the first non-metal part according to the present embodiment.
Figure 19:
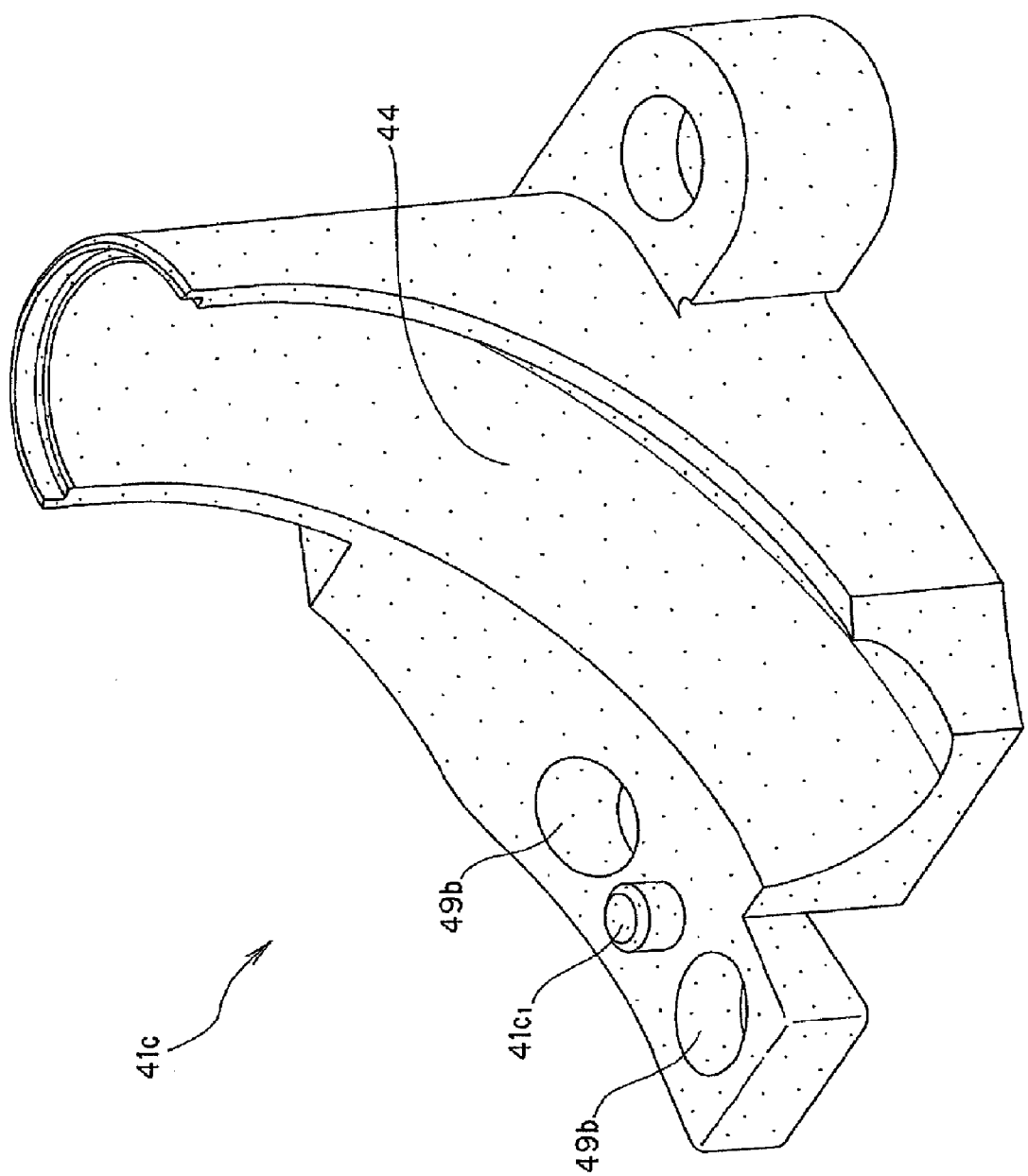
FIG. 19 is a perspective view showing an outer configuration of a second non-metal part according to the present embodiment.
Figure 20:
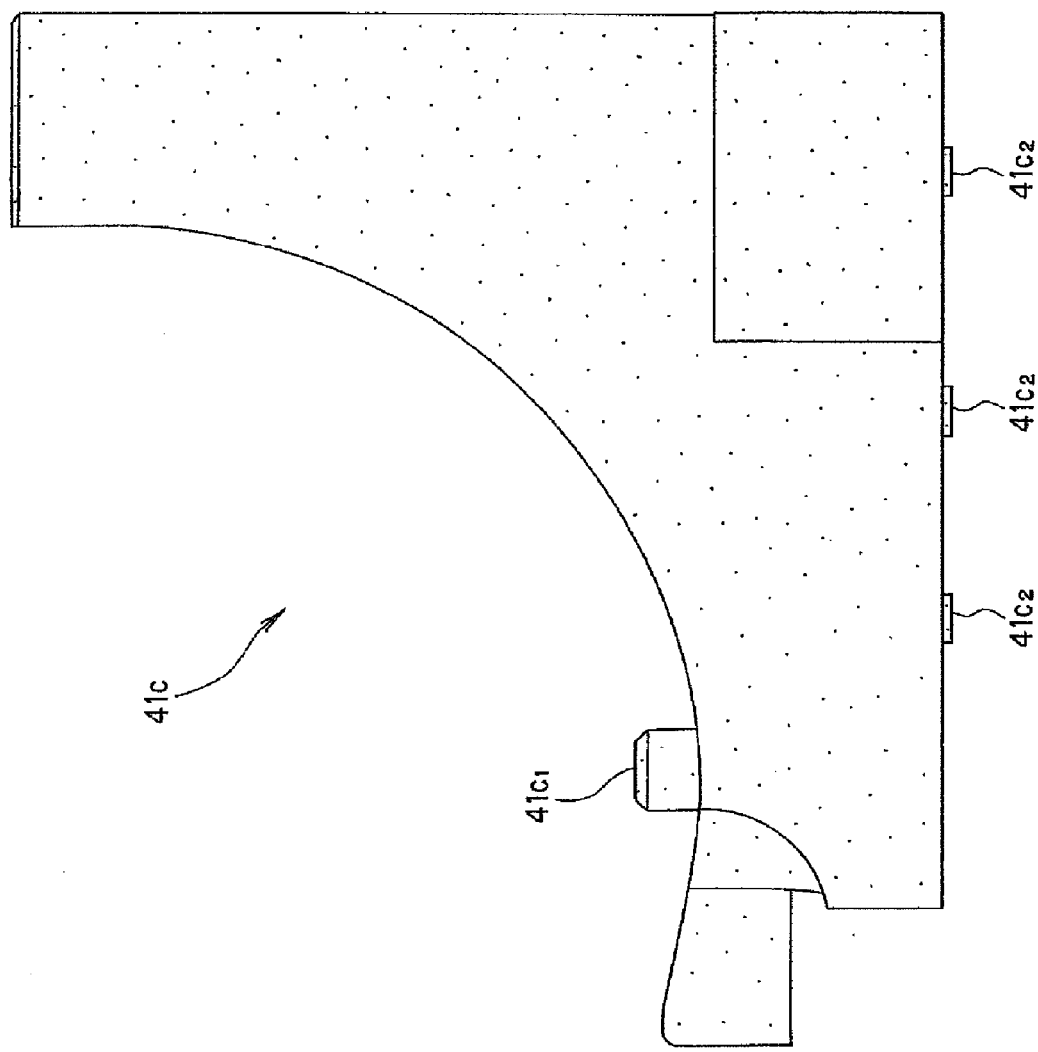
FIG. 20 is a side view of the second non-metal part of the present embodiment.
Figure 21:
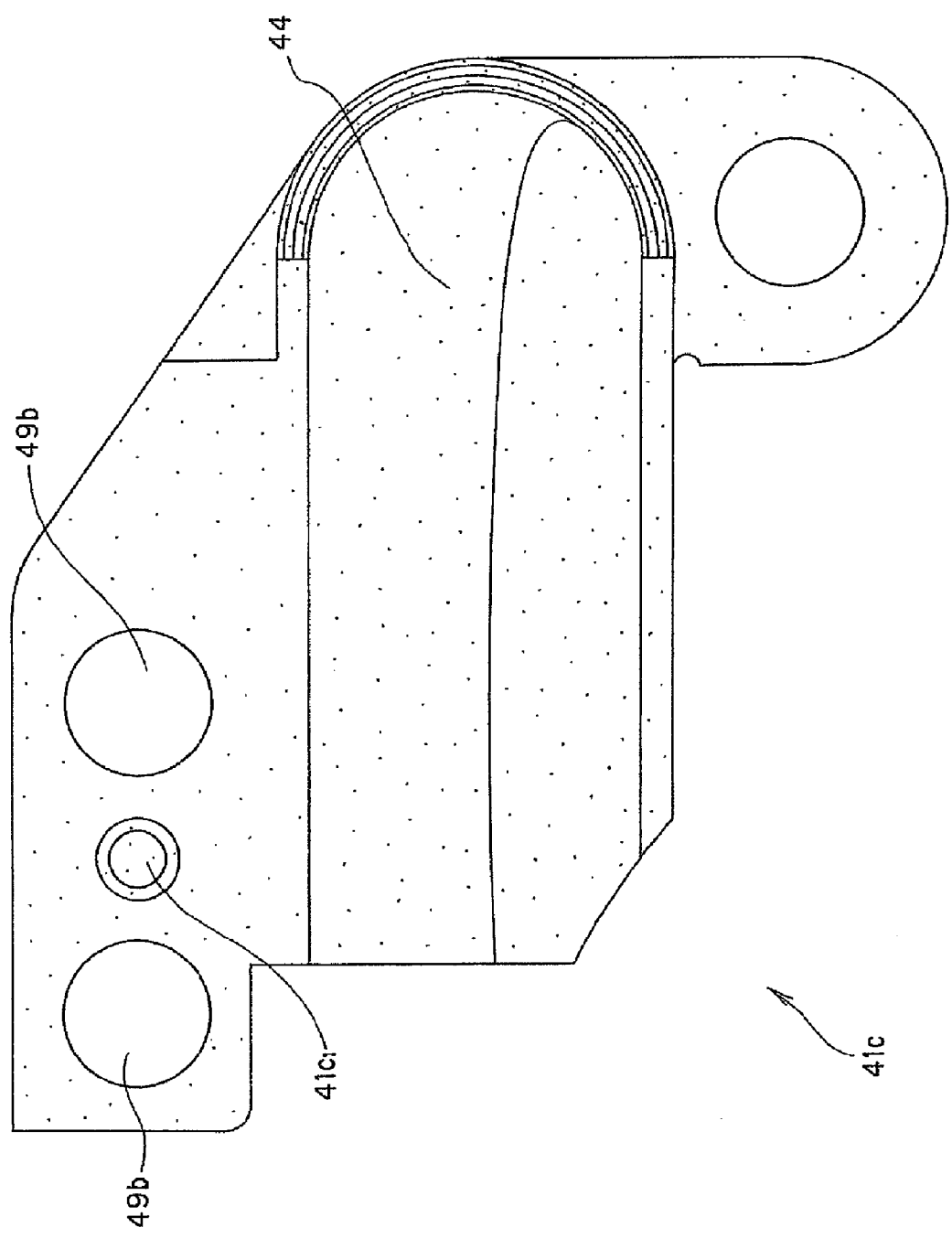
FIG. 21 is a plan view, from an upper side, of the second non-metal part according to the present embodiment.

FIGS. 8 to 11 show an entire outer appearance or configuration of the return piece 41, in which FIG. 8 shows a location side of the recessed portion 28 of the return piece 41, and FIG. 9 shows a side on which the return piece 41 receives a pressing force from the cover plate 25. FIG. 10 is a side view of the return piece 41 and FIG. 11 is a front view of the return piece.

The return piece 41 is, as mentioned above, a member to which is formed the direction changing passage 42 for connecting and communicating the loaded rolling body passage as the loaded area of the endless track, the non-loaded rolling body passage 23 as the non-loaded area of the endless track with each other.

As shown in FIGS. 8 to 11, the direction changing passage 42 includes a scoop-up (scooping) portion 43 for scooping the ball 31 rolling along the loaded rolling body passage as the loaded area of the endless track into the direction changing passage 42 as the non-loaded area of the endless track and a route path 44 forming the circulation route path of the ball 31 scooped by the scooping portion 43.

Furthermore, the return piece 41 is composed of three parts including one portion in the vicinity of the scooping portion 43 formed of one metal part 41a and two portions in the vicinity of the route path 44 of the return piece 41 formed of two non-metal parts (first non-metal part 41b and second non-metal part 41c).

FIGS. 12 to 15 show the metal part 41a including the scoop-up portion 43, which is formed so as to provide a boat-bottom shape. The scoop-up portion 43 serves to gradually scoop, in accordance with the boat-bottom shape thereof, the balls 31 moving from the loaded rolling body passage as the loaded area to the direction changing passage 42 as the non-loaded area and smoothly move the balls 31, (and of course, reversely, it is possible to move the balls 31 from the direction changing passage 42 to the loaded rolling body passage).

Furthermore, the metal part 41a is provided with a lip portion 45 at a portion opposing to the scooping portion forming portion for preventing the spacer members 32 disposed between a plurality of balls 31 from falling off. The lip portion 45 serves to prevent the fall-off of the spacer member 32 during the circulation thereof and maintain the stable location thereof between the balls 31.

As mentioned above, the area composed of the metal part 41a is limited to areas in the vicinity of the scoop-up portion 43 or the lip portion 45 which are loaded by the balls 31 and the spacer members 32. By adopting such structure, the return piece 41 has minimum area formed of the metal material, so that the screw device can be easily manufactured without damaging the quality.

On the other hand, the first and second non-metal parts 41b and 41c are formed of non-metal materials such as resin. The reason why such non-metal materials are adopted resides in that the route path 44 formed of the first and second non-metal parts 41b and 41c is mere a path for circulating the balls 31 with non-loaded condition, and it is therefore not necessary for these portions with metal materials having high strength. In addition, the direction changing passage 42 connecting the loaded rolling body passage and the non-loaded rolling body passage 23 is formed so as to describe a curve. However, it is difficult for such curved route path to be formed by using a metal material in a technical viewpoint, which may require increased manufacturing cost. Because of such reason, it is reasonable for the first and second non-metal parts 41b and 41c to be formed of non-metal material such as resin as in the present embodiment, which may lead to the reduction of the manufacturing cost.

Further, divided/joined surfaces of the first non-metal part 41b and the second non-metal part 41c is formed so that the route path 44 is halved along the passing direction, and a shape considering easiness in the manufacturing process using a mold is adopted.

As mentioned hereinabove, the return piece 41 is composed of the combined assembly of the metal part 41a, the first non-metal part 41b and the second non-metal part 41c. However, such combination of these parts may be preferably performed by fitting a boss formed to one part into a boss hole formed to the other part.

Figure 22:
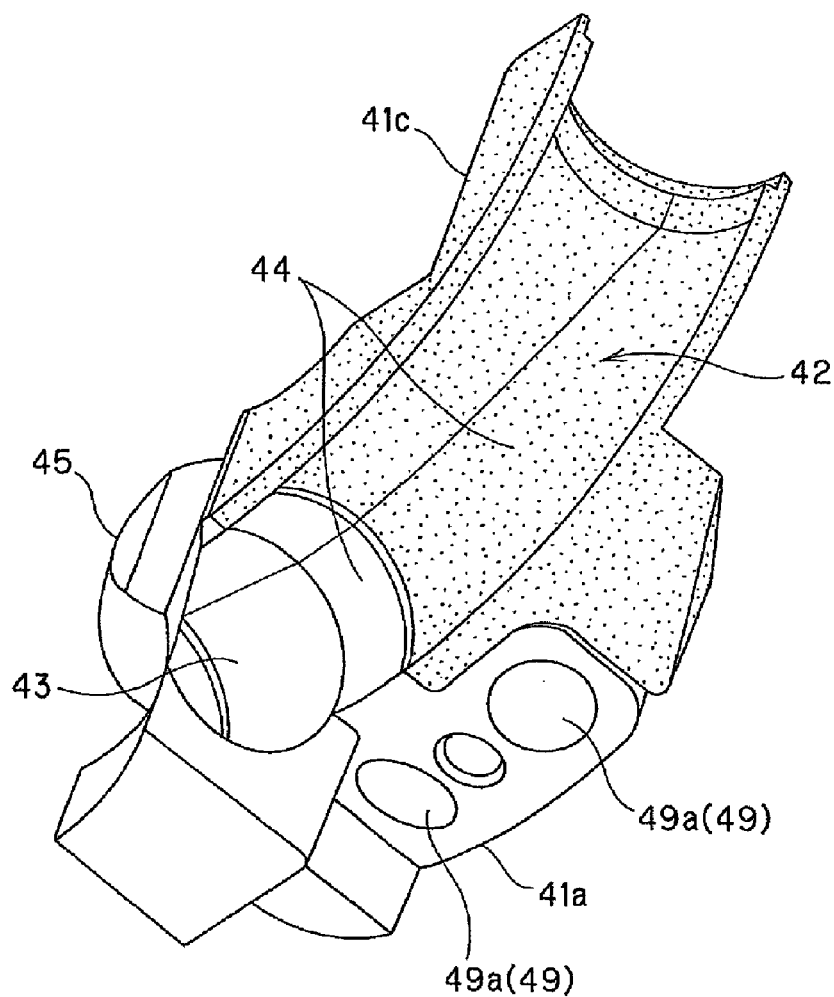
FIG. 22 is a view showing an assembled state of the metal part and the second non-metal part.

For example, in the presently described embodiment, a boss 41b1 formed to the first non-metal part 41b is fitted into a boss hole 41a1 formed to the metal part 41a, and a boss 41c1 formed to the second non-metal part 41c is fitted into a boss hole 41a2 formed to the metal part 41a. Furthermore, with the first non-metal part 41b and the second non-metal part 41c, their positions to be combined are determined by commonly fitting to the respective divided/joined surfaces and the metal part 41a. Further, one example of such combination of the metal part 41a and the second non-metal part 41c is shown in FIG. 22, and as being apparent from this FIG. 22, it will be understood that the route path 44 describing a proper curved line may be formed by a coupling means composed of the boss 41c1 and the boss hole 41a2.

The return piece 41 is formed with a plurality of bolt holes 49 for realizing the fixing with respect to the nut body portion 24 after the fitting into the recessed portion 28 of the nut body portion 24 (see FIG. 8 or like), and for these plural bolt holes 49, it is preferred to be formed so as to penetrate commonly the respective members when the metal part 41a and the non-metal parts 41b and 41c are combined.

For example, in the return piece 41 according to the present embodiment, by overlapping two holes 49a formed to the metal part 41a and two holes 49b formed to the second non-metal part 41c with each other, two bolt holes 49 commonly penetrating these metal part 41a and non-metal part 41c are formed. By using such bolt holes 49, the return piece 41 is screwed and fastened to the nut body portion 24, whereby the assembling and coupling strength of the entire structure of the return piece 41 formed by the combination of many parts or members can be achieved, and in addition, the strengthened fixing and holding structure with respect to the nut body portion 24 can be realized. Accordingly, the stable circulation motion of the balls 31 can be achieved and the rolling body screw device 10 having high guiding performance can be provided.

Furthermore, the return piece 41 according to the present embodiment is formed with a plurality of projections (or protruded portions) 41c2 to a rear surface of the second non-metal part 41c, i.e., to a surface on the side to which pressing force from the cover plate 25 is received. These plural projections 41c2 are ones formed for the purpose of applying the pressing force from the cover plate 25 entirely uniformly to the pressed surface of the return piece 21, and as shown in FIG. 9, three projections 41c2 are formed to the portions near the corner portions of the rear surface (pressing surface) of the second non-metal part 41c. According to the function of these three projections 41c2, the pressing force from the cover plate 25 can be dispersed entirely uniformly on the return piece 41, thereby stably maintaining the setting condition of the return piece 41.

Further, the metal part 41a formed of metal material among the constitutional members of the return piece 41 may be preferably formed by a metal power injection molding method (MIM). This MIM method makes it possible to mold a part or like having a three dimensional complicated structure even in mass-production, thus being suitable for the manufacturing method of the metal part 41a according to the present embodiment. Moreover, since the return piece 41 is formed from a divisional body, even for the rolling body screw device having a large model number, a small metal part 41a may be manufactured with respect to the model number, so that the metal part 41a of the present embodiment can be manufactured with various shapes and dimensions, and accordingly, it is easy to apply the MIM method at the time of the mass-production.

On the other hand, as to the non-metal parts 41b and 41c of the constitutional members of the return piece 41, it may be preferred to form these non-metal parts from an easily moldable material including resin material. Further, since these non-metal parts 41b and 41c are less loaded from the balls 31 and only guide the circulation of the balls 31, they may be formed from various materials having easily moldability such as various resin materials, plastic materials, rubber materials or like.

Hereunder, the reason why the divided positions of the three members, that is, metal part 41a, first non-metal part 41b and second non-metal part 41c, are determined to the positions shown in FIGS. 8 to 21, will be explained with reference to FIGS. 23 to 25.

Figure 23:
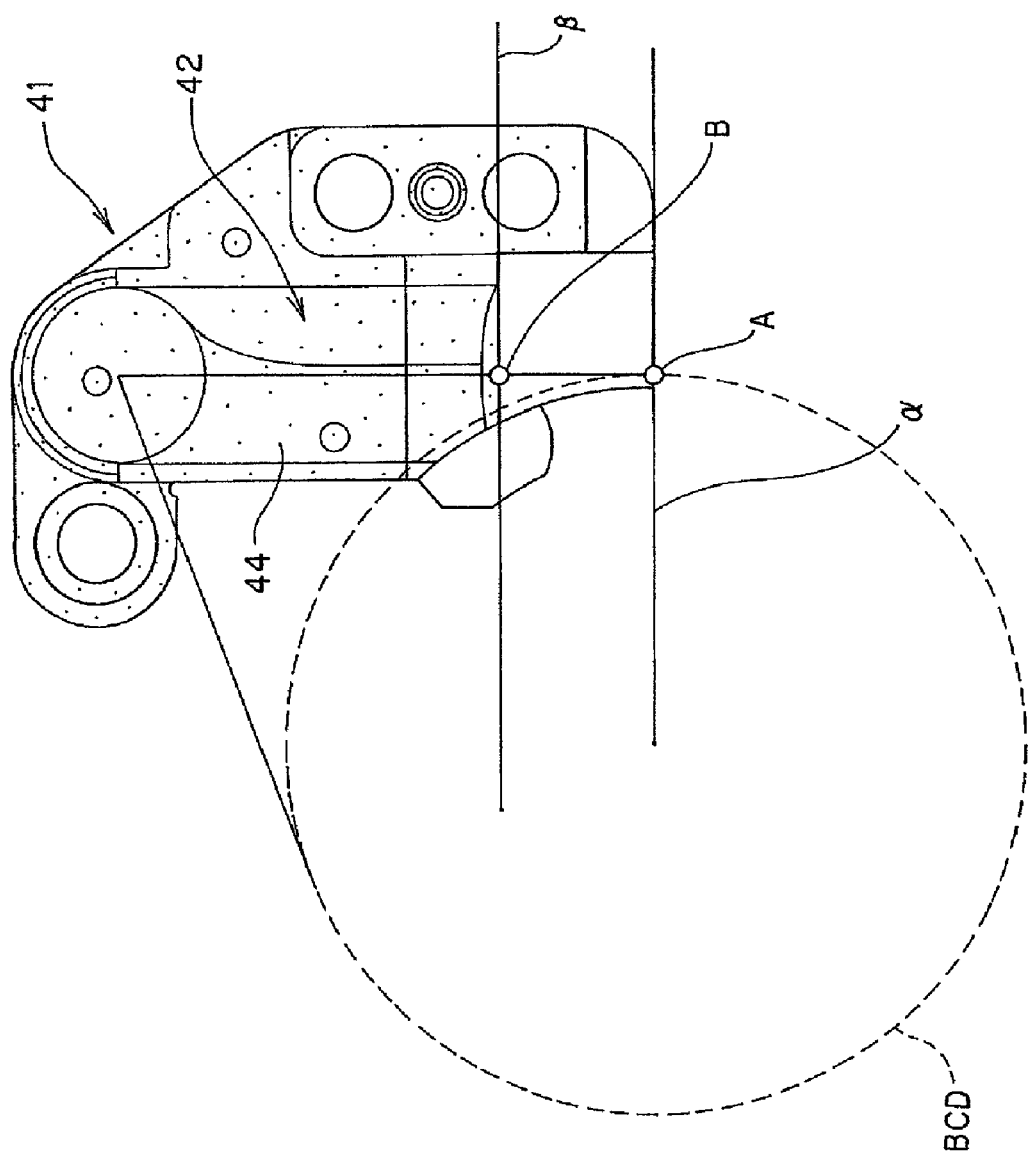
FIG. 23 is a perspective transparent view for explaining a boundary surface between the metal part and the second non-metal part.

FIG. 23 is a transparent view explaining a boundary surface of the metal part 41a and the second non-metal part 41c and shows a case when the return piece 41 of the present embodiment is viewed from the axial direction of the screw shaft 11. A circular portion described with a broken line shows an orbit of the center of the ball 31 (BCD). The direction changing passage 42 formed to the return piece 41 includes the scoop-up portion 43 extending from the point A from which the ball scooping starts to the point B, and a passage continuous to the point B forms the route path 44.

The scooped-up ball 31 is not loaded when passing through the curved route path 44, and therefore, this portion can be formed of a non-metal material. Accordingly, the side near the scoop-up portion 43 from the point B, with the point B being boundary from which the ball 31 passing through the scoop-up portion 43 moves to the route path 44, is formed of the metal part 41a, and on the contrary, the side toward the route path 44 from the point B is formed of the second non-metal part 41c. Further, the boundary surface between the metal part 41a and the second non-metal part 41c is in parallel with a line a connecting the center point of the BCD and the point A as the terminal point of the scooping portion 43, and a line β passing on the point B adopts a position passing on the direction changing passage 42.

Figure 24:
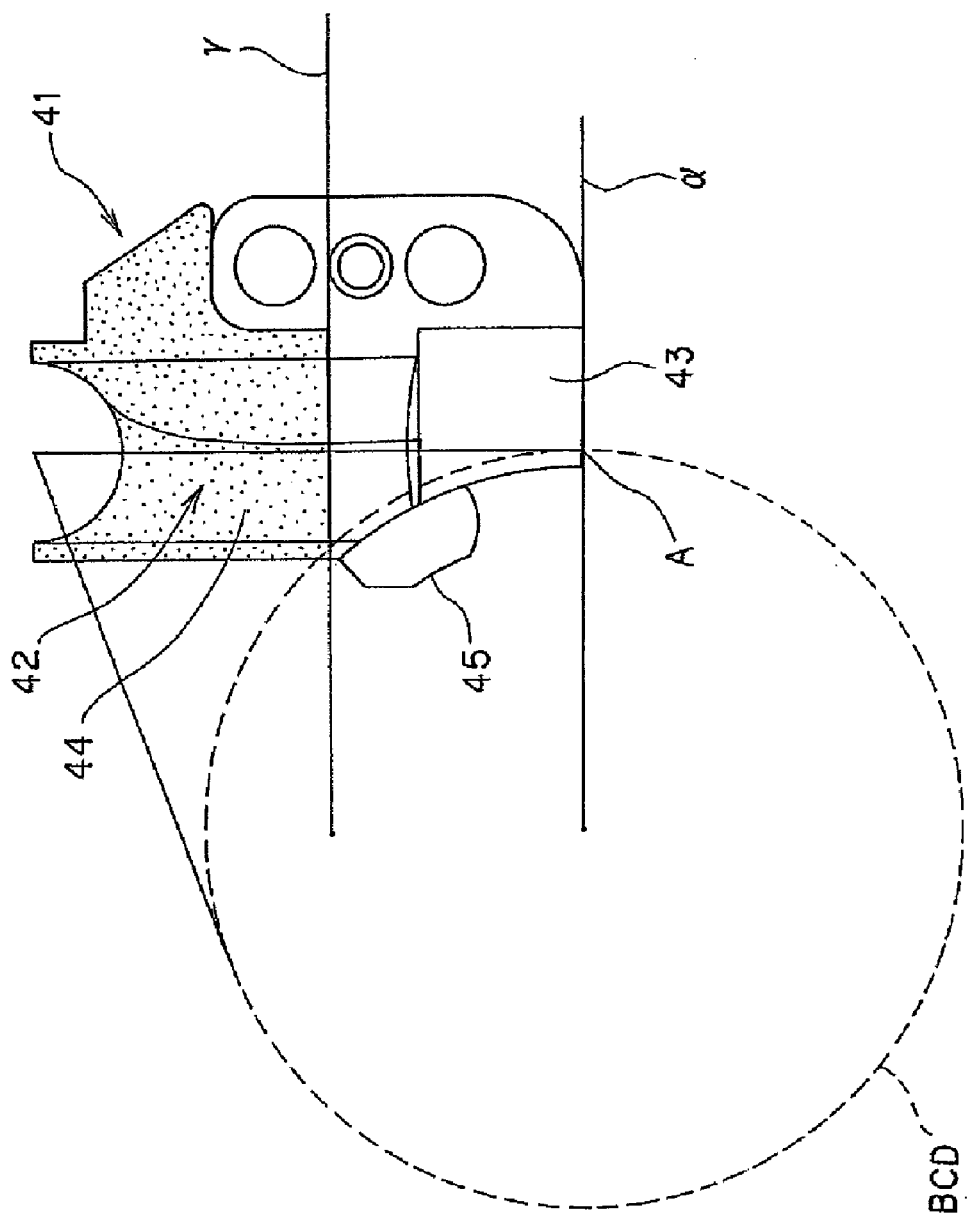
FIG. 24 is a view for explaining a boundary surface between the metal part and the first non-metal part.

Next, FIG. 24 is a view for explaining the boundary surface between the metal part 41a and the first non-metal part 41b, and the boundary surface between the metal part 41a and the first non-metal part 41b is set in consideration of the existence of the lip portion 45. That is, in the case where the return piece 41 does not include the lip portion 45, a boundary surface like the boundary surface of the second-non-metal part 41c as mentioned above, but the lip portion 45 scooping the spacer member 32 is formed with respect to the return piece 41, so that it is necessary for the area including the lip portion 45 to be the metal part 41a. Accordingly, the first non-metal part forming area is in parallel with the line α connecting the center point of the screw shaft 11 and the point A as the terminal point of the scooping portion 43, and in addition, it is preferred that a line γ as a line section passing on the route path 44 side than the lip portion forming portion adopts a position passing on the direction changing passage 42.

Figure 25:
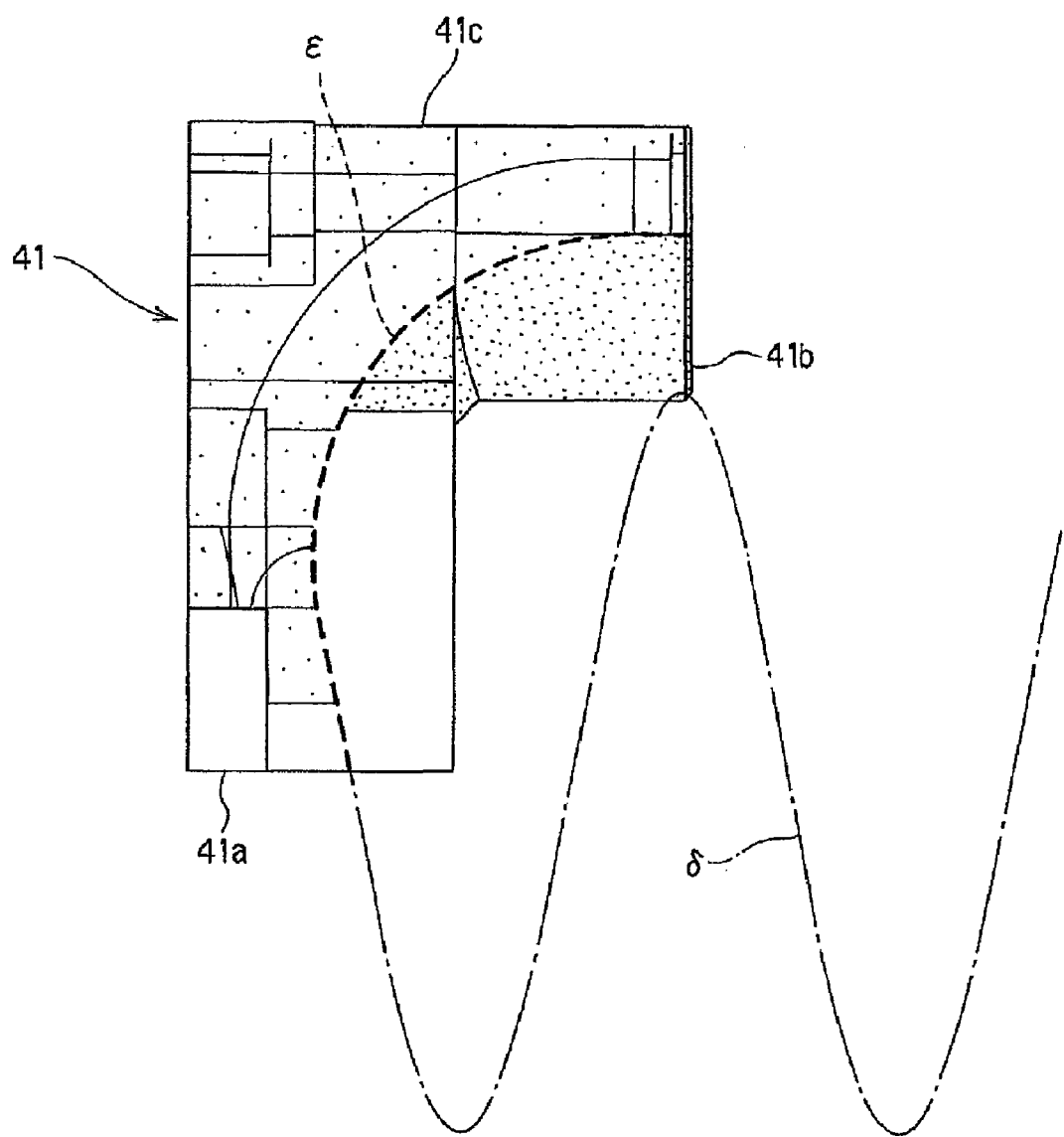
FIG. 25 is a view for explaining a boundary surface between the first non-metal part and the second non-metal part.

Further, as to the boundary surface between the first non-metal part 41b and the second non-metal part 41c, as shown in FIG. 25, it is preferred to adopt a surface along a curved line ε as a line section of the track of the center of the ball 31 rolling in the direction changing passage 42 being the non-load area, which is described continuously to a track δ of the center of the ball 31 rolling in the loaded rolling body passage, and the boundary surface by this curved line ε corresponds to the case in which the direction changing passage 42 is divided into two portions by the center.

In the above, although the preferred embodiments of the present invention were described, the technical scope of the present invention is not limited to the scope of the embodiments described above, and many other changes and modifications may be made to the described embodiments.

For example, the return piece 41 according to the present invention is composed of three parts, i.e., the metal part 41a formed of a metal material, and the first and second non-metal parts 41b and 41c formed of a non-metal material. However, various modes or shapes may be adopted for the dividing numbers or shapes of the return piece. That is, the metal part and the non-metal parts may be composed by combining further plural divided (dividable) parts.

Furthermore, although the embodiments described above show the structure in which the metal part 41a and the non-metal parts 41b and 41c are assembled, the applicable range of the present invention is not limited to such embodiments. For example, it may be possible to insert the metal part 41a to the non-metal parts 41b and 41c through an insert molding process to thereby integrally mold the return piece 41.

Furthermore, the rolling body screw device 10 of the present embodiment is formed with two rows of endless tracks, and accordingly, provided with four return pieces 41 including two pieces on the respective end sides of the nut member 21. However, the structure conceivable by the present invention is not limited to the embodiment described above, and is applicable to rolling body screw devices having numerous rows of endless tracks.

Still furthermore, in the rolling body screw device described above, although the balls 31 were referred to as rolling bodies, rollers or the like rolling members may be applicable to the present invention. Thus, it is apparent that such changes, modifications and improvements of the above described embodiments are within the technical scope of the appended patent claims.

The invention claimed is:

1. A rolling body screw device comprising:
    a screw shaft having an outer surface in which a spiral rolling body rolling surface is formed;
    a nut member having an inner peripheral surface in which a spiral loaded rolling surface is formed so as to oppose to the rolling body rolling surface of the screw shaft and having a non-loaded rolling body passage;
    a pair of return pieces, one of the pair of return pieces being mounted to each end portion of the nut member, and including direction changing passages so as to form an endless track by connecting a loaded rolling body passage formed in association with the rolling body rolling surface and the loaded rolling surface and the non-loaded rolling body passage through the direction changing passages; and
    a number of rolling bodies rolling in the endless track, wherein
    each of the direction changing passages includes:
        a scoop-up portion scooping the rolling body rolling in the loaded rolling body passage as a loaded area of the endless track to the direction changing passage as a non-loaded area of the endless track; and
        a route path forming a circulation path of the rolling body scooped by the scoop-up portion, and
    each of the return pieces is composed, in combination, of a metal part formed of a metal material including the scoop-up portion, and a non-metal part formed of a non-metal material including the route path.

2. The rolling body screw device according to claim 1, wherein the scoop-up portion is formed in a concave shape, and a portion in a vicinity of the formation of the concave shaped portion is formed of the metal part.

3. The rolling body screw device according to claim 2, wherein the direction changing passage includes a lip portion, for aligning and circulating spacer members disposed between the rolling bodies, at a portion opposing to the portion at which the scoop-up portion is formed, and a portion in a vicinity of the formation of the lip portion is formed of the metal part.

4. The rolling body screw device according to claim 2, wherein each of the return pieces has one end side fitted into a recessed portion formed to the end portion of the nut member, and has another end side is pressed by a cover plate to thereby position the return piece with respect to the nut member.

5. The rolling body screw device according to claim 2, wherein either one of the metal part and the non-metal part is formed with a boss and another one thereof is formed with a boss hole, and the return piece is constituted by fitting the boss into the boss hole, and a bolt hole formed by combining the metal part and the non-metal part is formed to each of the metal part and the non-metal part as through hole, and the return piece is screwed and fastened with the nut member by means of the bolt holes.

6. The rolling body screw device according to claim 2, wherein the metal part or non-metal part is formed by further combining a plurality of divided parts.

7. The rolling body screw device according to claim 1, wherein the direction changing passage includes a lip portion, for aligning and circulating spacer members disposed between the rolling bodies, at a portion opposing to the portion at which the scoop-up portion is formed, and a portion in a vicinity of the formation of the lip portion is formed of the metal part.

8. The rolling body screw device according to claim 7, wherein each of the return pieces has one end side fitted into a recessed portion formed to the end portion of the nut member, and has another end side is pressed by a cover plate to thereby position the return piece with respect to the nut member.

9. The rolling body screw device according to claim 7, wherein either one of the metal part and the non-metal part is formed with a boss and another one thereof is formed with a boss hole, and the return piece is constituted by fitting the boss into the boss hole, and a bolt hole formed by combining the metal part and the non-metal part is formed to each of the metal part and the non-metal part as through hole, and the return piece is screwed and fastened with the nut member by means of the bolt holes.

10. The rolling body screw device according to claim 7, wherein the metal part or non-metal part is formed by further combining a plurality of divided parts.

11. The rolling body screw device according to claim 1, wherein each of the return pieces has one end side fitted into a recessed portion formed to the end portion of the nut member, and has another end side is pressed by a cover plate to thereby position the return piece with respect to the nut member.

12. The rolling body screw device according to claim 11, wherein either one of the metal part and the non-metal part is formed with a boss and another one thereof is formed with a boss hole, and the return piece is constituted by fitting the boss into the boss hole, and a bolt hole formed by combining the metal part and the non-metal part is formed to each of the metal part and the non-metal part as through hole, and the return piece is screwed and fastened with the nut member by means of the bolt holes.

13. The rolling body screw device according to claim 11, wherein the metal part or non-metal part is formed by further combining a plurality of divided parts.

14. The rolling body screw device according to claim 11, wherein the another end side of the return piece pressed by the cover plate has a pressed surface to which a plurality of projections are formed so as to distribute the pressing force from the cover plate to an entire area of the pressed surface.

15. The rolling body screw device according to claim 14, wherein either one of the metal part and the non-metal part is formed with a boss and another one thereof is formed with a boss hole, and the return piece is constituted by fitting the boss into the boss hole, and a bolt hole formed by combining the metal part and the non-metal part is formed to each of the metal part and the non-metal part as through hole, and the return piece is screwed and fastened with the nut member by means of the bolt holes.

16. The rolling body screw device according to claim 14, wherein the metal part or non-metal part is formed by further combining a plurality of divided parts.

17. The rolling body screw device according to claim 1, wherein either one of the metal part and the non-metal part is formed with a boss and another one thereof is formed with a boss hole, and the return piece is constituted by fitting the boss into the boss hole, and a bolt hole formed by combining the metal part and the non-metal part is formed to each of the metal part and the non-metal part as through hole, and the return piece is screwed and fastened with the nut member by means of the bolt holes.

18. The rolling body screw device according to claim 1, wherein the metal part or non-metal part is formed by further combining a plurality of divided parts.

19. The rolling body screw device according to claim 1, wherein the metal part is manufactured by a metal powder injection molding method (MIM).

20. The rolling body screw device according to claim 1, wherein a non-metal material constituting the non-metal part includes a resin material.

* * * * *